United States Patent
Koo et al.

(10) Patent No.: US 10,742,988 B2
(45) Date of Patent: Aug. 11, 2020

(54) METHOD AND APPARATUS FOR PROCESSING VIDEO SIGNAL USING GRAPH-BASED TRANSFORM

(71) Applicant: LG Electronics Inc., Seoul (KR)

(72) Inventors: Moonmo Koo, Seoul (KR); Jin Heo, Seoul (KR); Eunyong Son, Seoul (KR); Sehoon Yea, Seoul (KR); Seungwook Park, Seoul (KR); Kyuwoon Kim, Seoul (KR); Bumshik Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 102 days.

(21) Appl. No.: 15/550,721

(22) PCT Filed: Feb. 4, 2016

(86) PCT No.: PCT/KR2016/001252
§ 371 (c)(1),
(2) Date: Aug. 11, 2017

(87) PCT Pub. No.: WO2016/129872
PCT Pub. Date: Aug. 18, 2016

(65) Prior Publication Data
US 2018/0041760 A1   Feb. 8, 2018

Related U.S. Application Data

(60) Provisional application No. 62/139,774, filed on Mar. 29, 2015, provisional application No. 62/138,397, (Continued)

(51) Int. Cl.
*H04N 19/14* (2014.01)
*H04N 19/96* (2014.01)
(Continued)

(52) U.S. Cl.
CPC .......... *H04N 19/14* (2014.11); *H04N 19/119* (2014.11); *H04N 19/122* (2014.11); *H04N 19/61* (2014.11); *H04N 19/96* (2014.11); *H04N 19/176* (2014.11)

(58) Field of Classification Search
CPC ... H04N 19/597; H04N 19/176; H04N 19/527
(Continued)

(56) References Cited

U.S. PATENT DOCUMENTS

| | | | |
|---|---|---|---|
| 9,565,451 B1 * | 2/2017 | Mukherjee | ........... H04N 19/176 |
| 2006/0147090 A1 * | 7/2006 | Yang | ...................... H04N 5/145 |
| | | | 382/107 |

(Continued)

FOREIGN PATENT DOCUMENTS

| | | |
|---|---|---|
| CN | 103501441 | 1/2014 |
| JP | 2014007477 | 1/2014 |

(Continued)

OTHER PUBLICATIONS

C. Zhang, K. Ugur, J. Lainema and M. Gabbouj, "Video coding using variable block-size spatially varying transform", ICASSP 2009 (Year: 2009).*

(Continued)

*Primary Examiner* — Daniel Chang
(74) *Attorney, Agent, or Firm* — Fish & Richardson P.C.

(57) ABSTRACT

The present invention provides a method of decoding a video signal using graph-based transform comprising the steps: extracting prediction unit partition information of a current coding unit from the video signal; obtaining a graph-based transform kernel from predetermined table information based on the prediction unit partition information; and performing an inverse-transform of a transform unit using the graph-based transform kernel, wherein the graph-based transform kernel corresponds to at least one of
(Continued)

the prediction unit partition information and an edge weight, and the edge weight is a predetermined value representing a correlation between pixels.

7 Claims, 20 Drawing Sheets

Related U.S. Application Data filed on Mar. 26, 2015, provisional application No. 62/115,587, filed on Feb. 12, 2015.

(51) Int. Cl.
*H04N 19/122* (2014.01)
*H04N 19/119* (2014.01)
*H04N 19/61* (2014.01)
*H04N 19/176* (2014.01)

(58) Field of Classification Search
USPC ....... 375/240.16, 240.18; 382/233, 107, 173, 382/268
See application file for complete search history.

(56) References Cited

U.S. PATENT DOCUMENTS

| | | | | |
|---|---|---|---|---|
| 2008/0037871 A1* | 2/2008 | Sinop | .................. | G06K 9/34 382/173 |
| 2009/0074071 A1* | 3/2009 | Nagumo | ............... | H04N 19/527 375/240.16 |
| 2010/0061652 A1* | 3/2010 | Takeshima | ............... | G06T 5/002 382/268 |
| 2011/0206288 A1* | 8/2011 | Lee | ...................... | H04N 19/597 382/233 |
| 2013/0272422 A1* | 10/2013 | Lee | ...................... | H04N 19/176 375/240.18 |
| 2014/0327697 A1* | 11/2014 | Yaegashi | .................. | G06T 3/00 345/625 |

FOREIGN PATENT DOCUMENTS

| | | |
|---|---|---|
| JP | 2014195324 | 10/2014 |
| KR | 10-2011-0093532 | 8/2011 |
| KR | 10-2011-0135787 | 12/2011 |
| KR | 10-2013-0050901 | 5/2013 |

OTHER PUBLICATIONS

W. S. Kim, S. K. Narang, A. Ortega, "Graph based transforms for depth video coding", Proc. ICASSP, pp. 813-816, Mar. 2012 (Year: 2012).*

Chinese Office Action in Chinese Application No. 201680015228.5, dated Jul. 3, 2019, 24 pages (with English translation).

* cited by examiner

[FIG. 1]
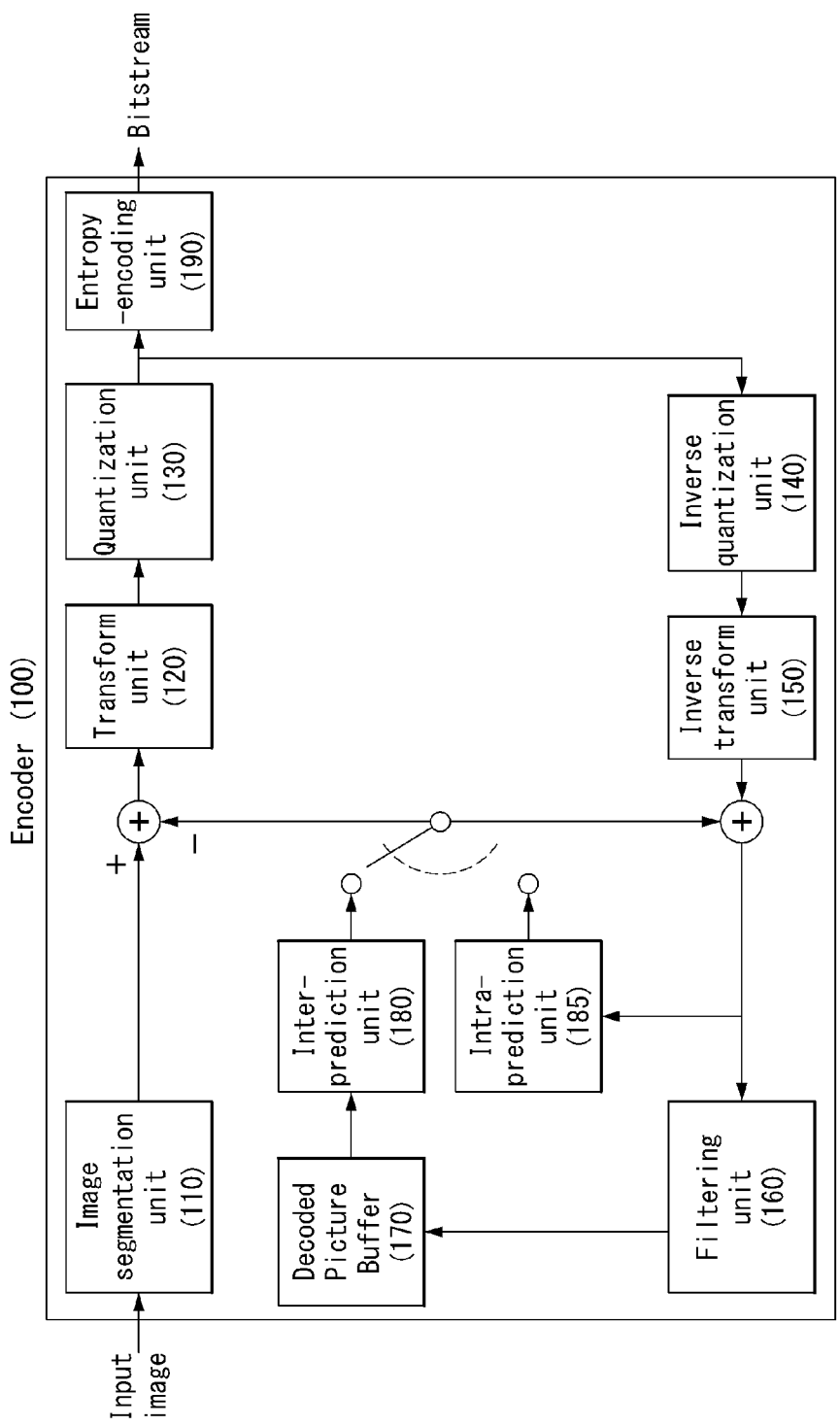

[FIG. 2]
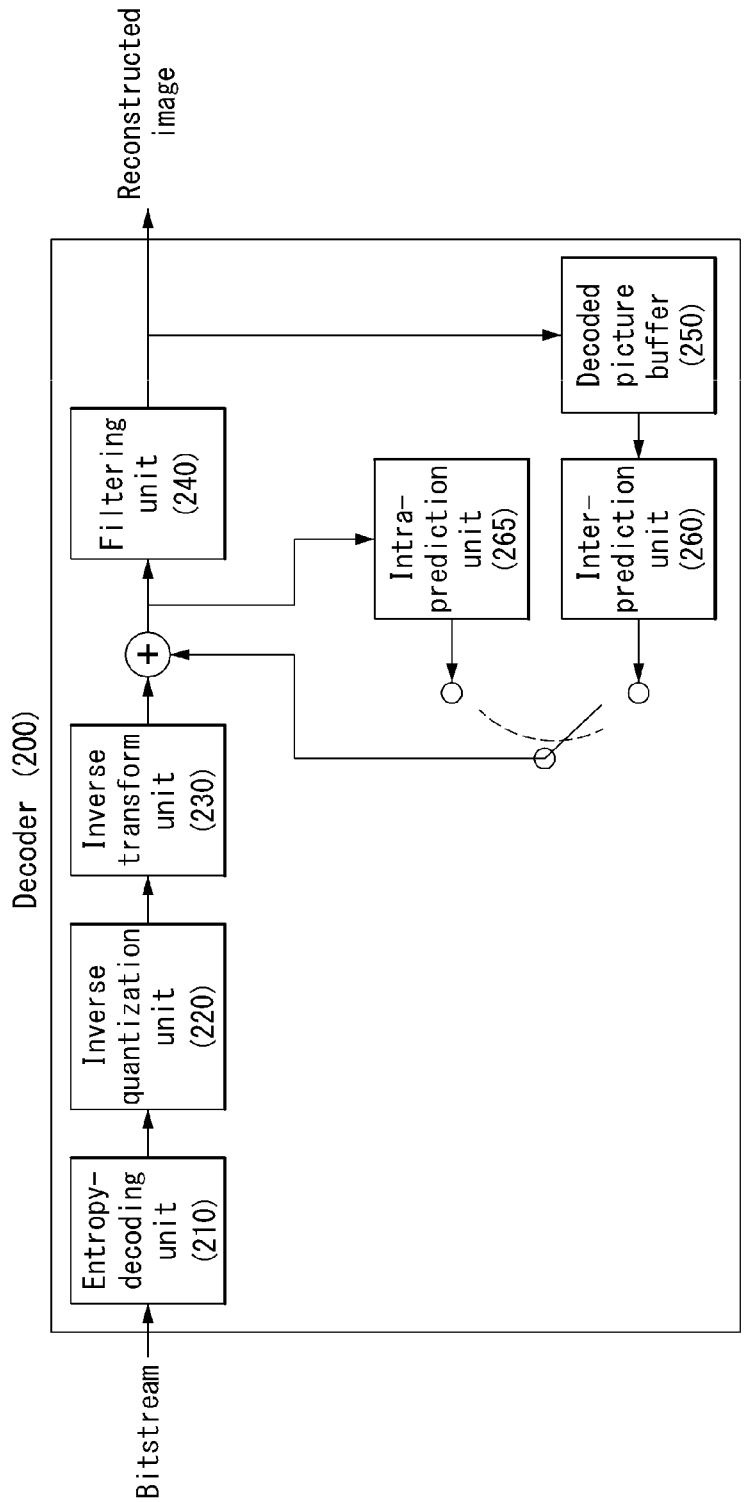

[FIG. 3]
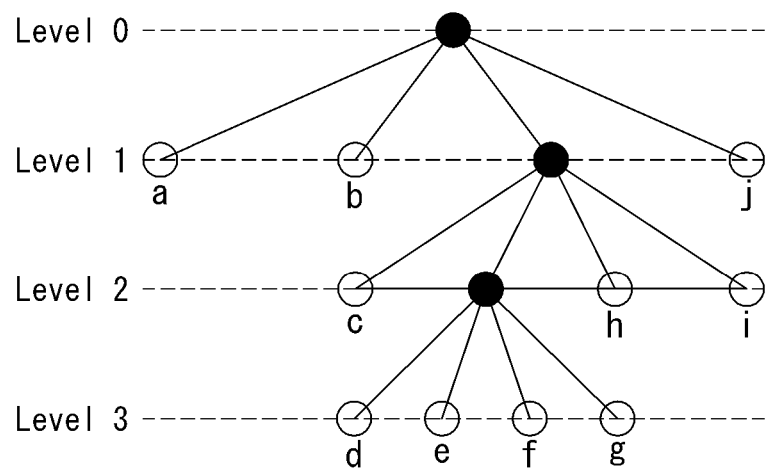
(a)
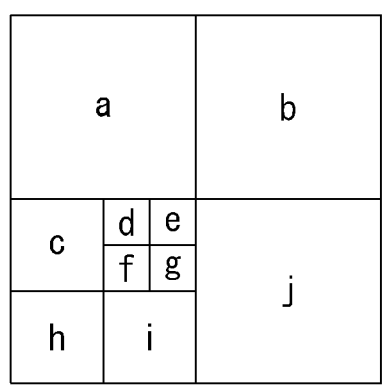
(b)

[FIG. 4]
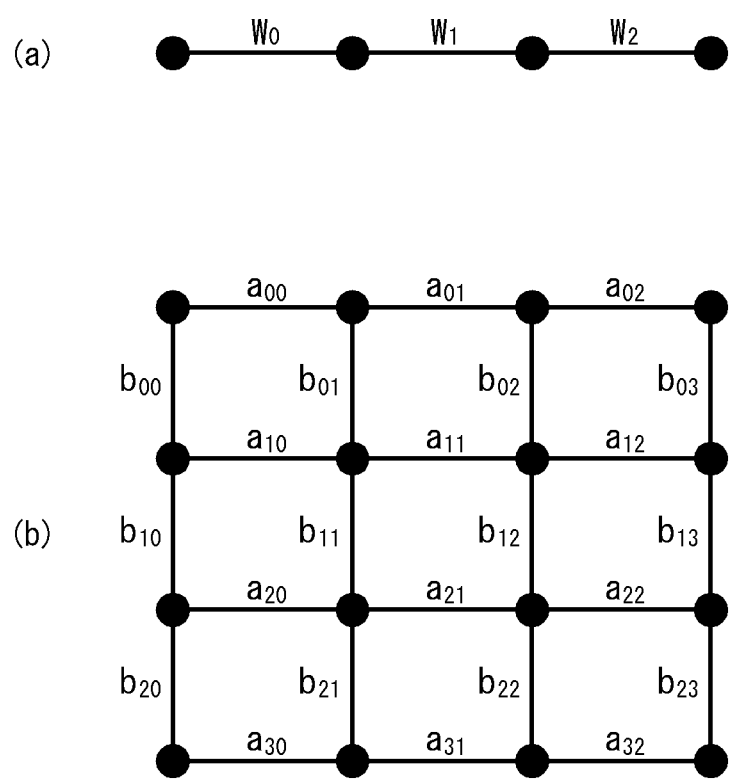

[FIG. 5]
Graph-based transform unit (500)
(a)
Graph-based transform unit (500)
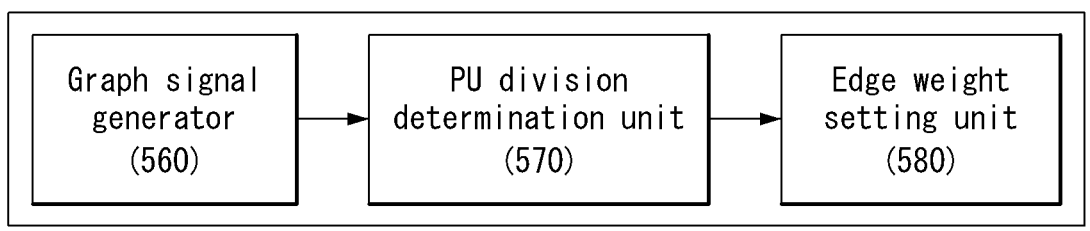
(b)

[FIG. 6]
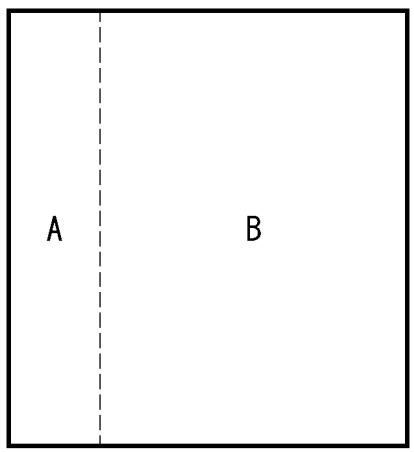
(a)
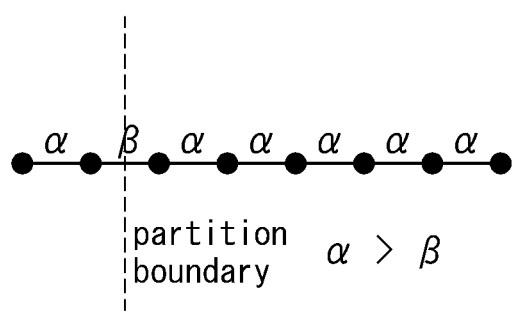
(b)

[FIG. 7]
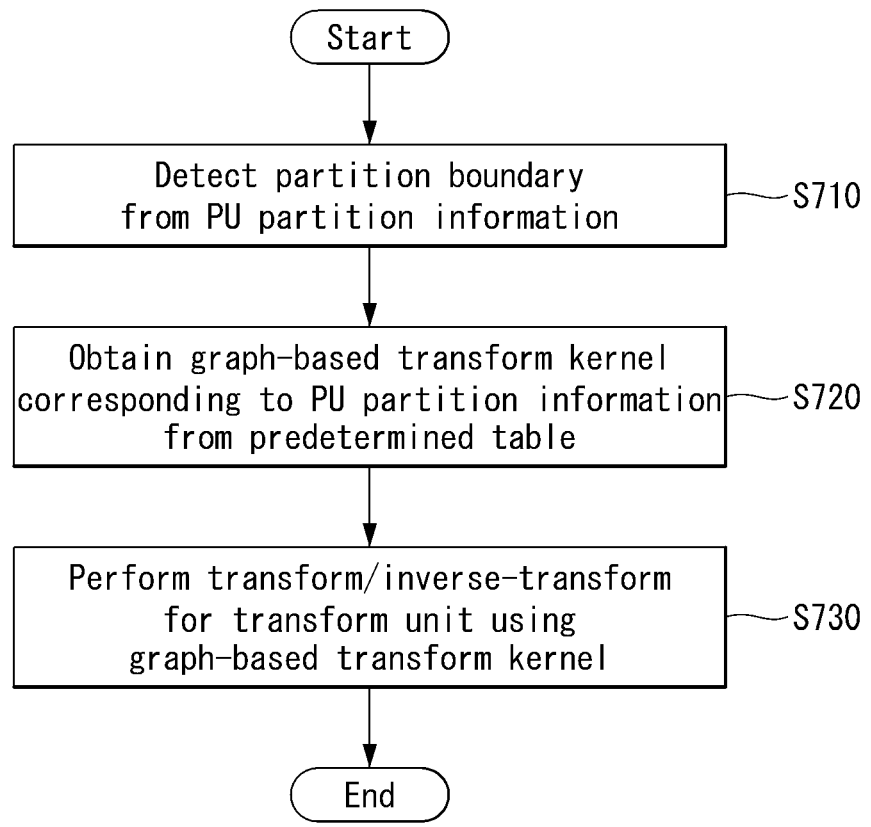

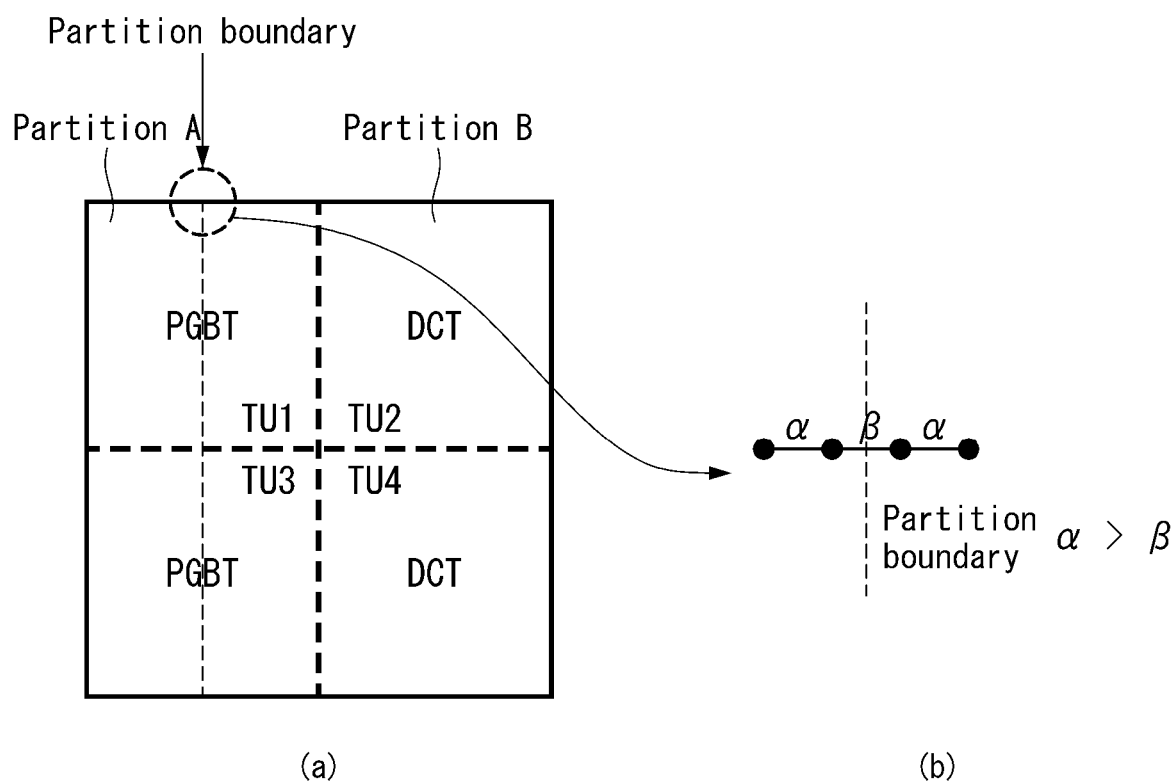

[FIG. 9]
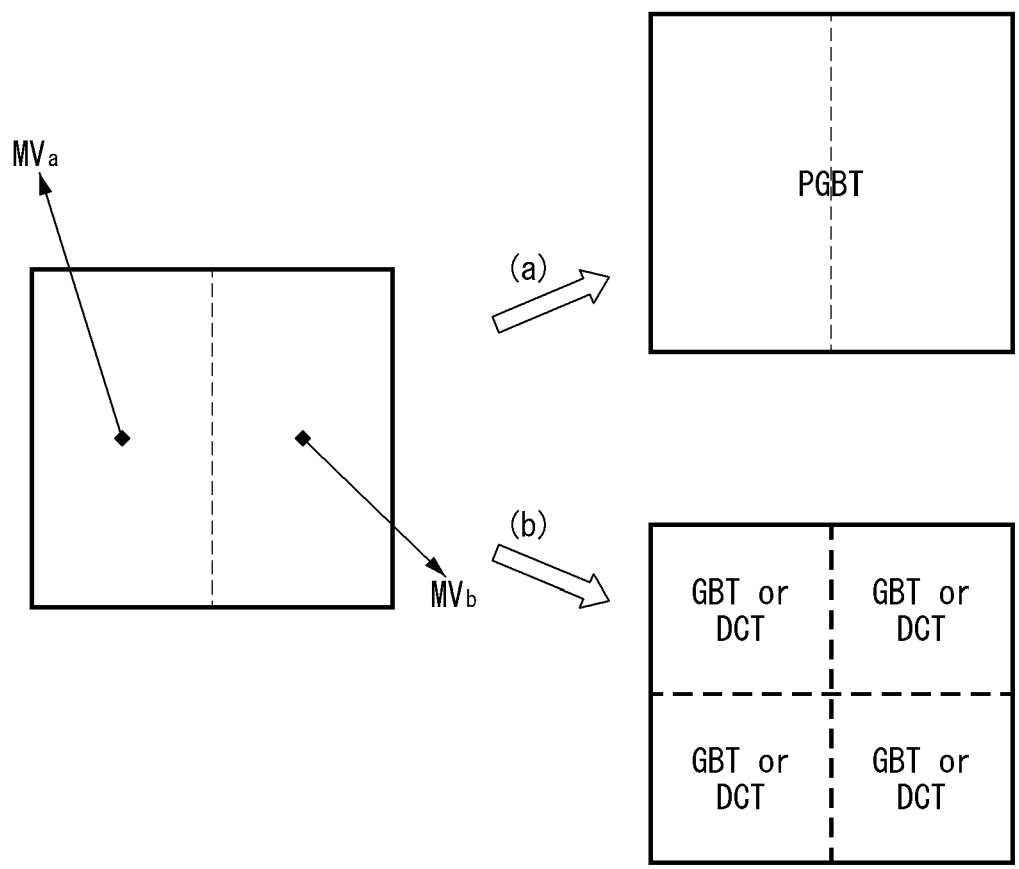

[FIG. 10]
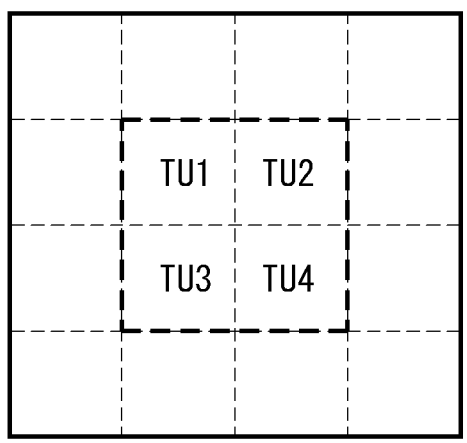
CU

[FIG. 11]
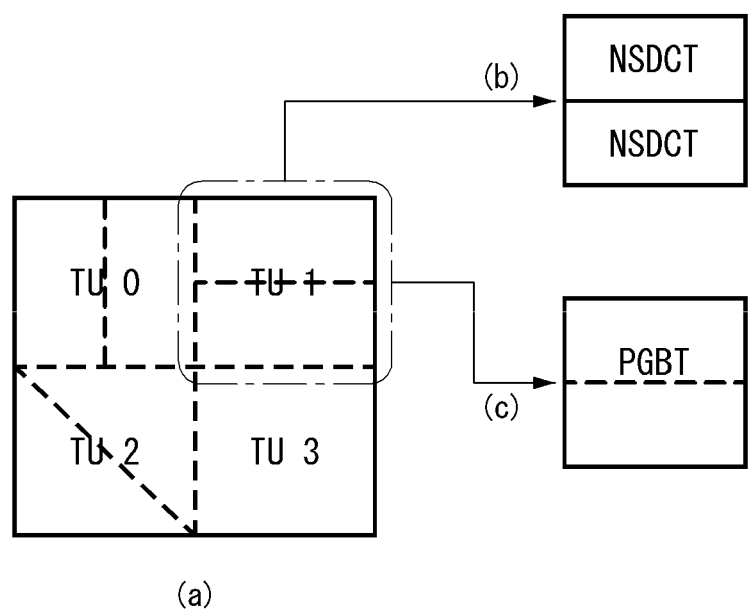

[FIG. 12]
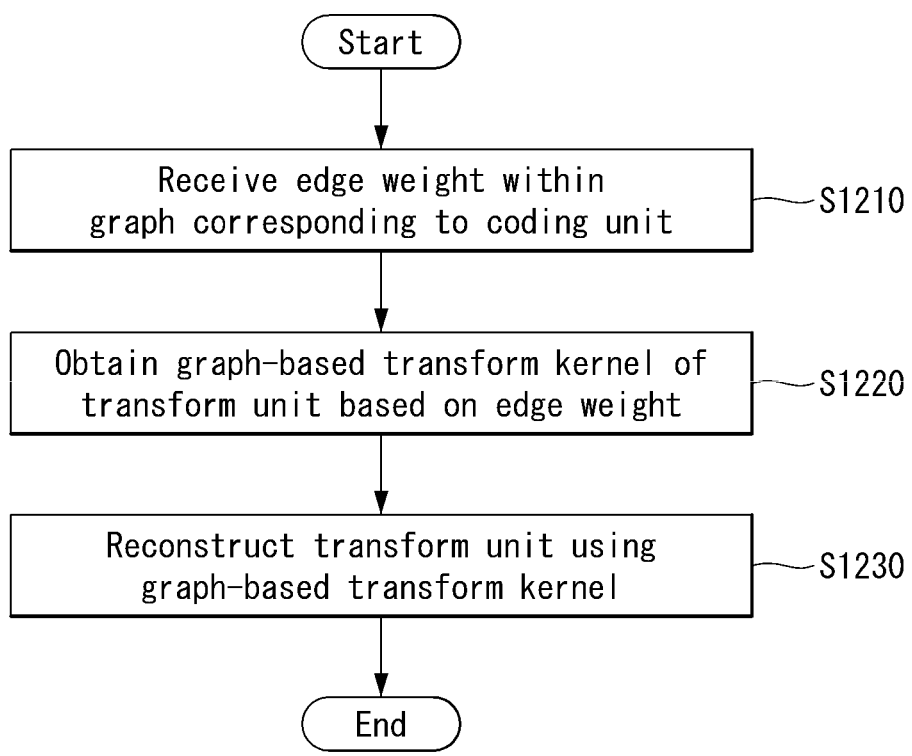

[FIG. 13]
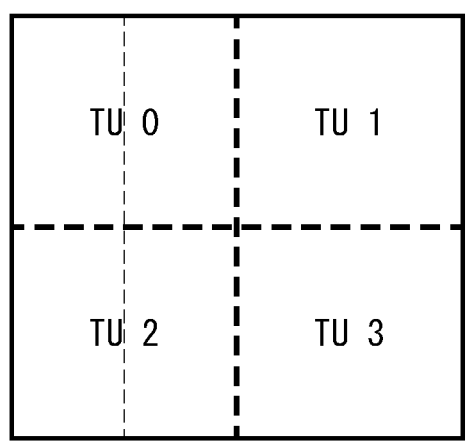

[FIG. 14]
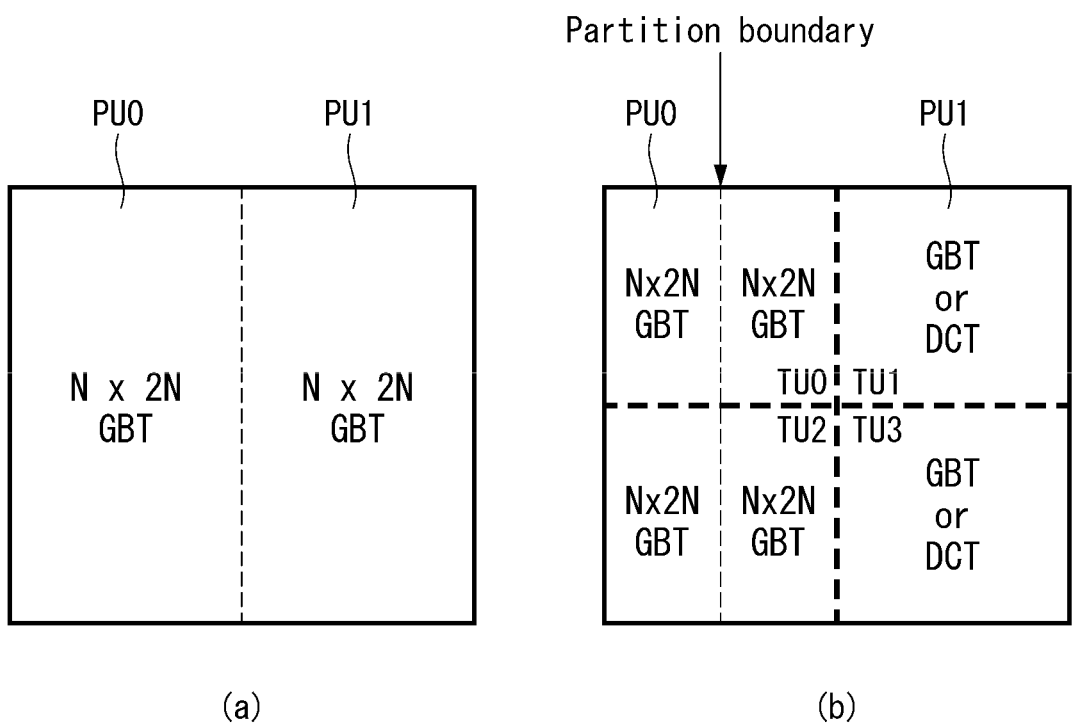

[FIG. 15]
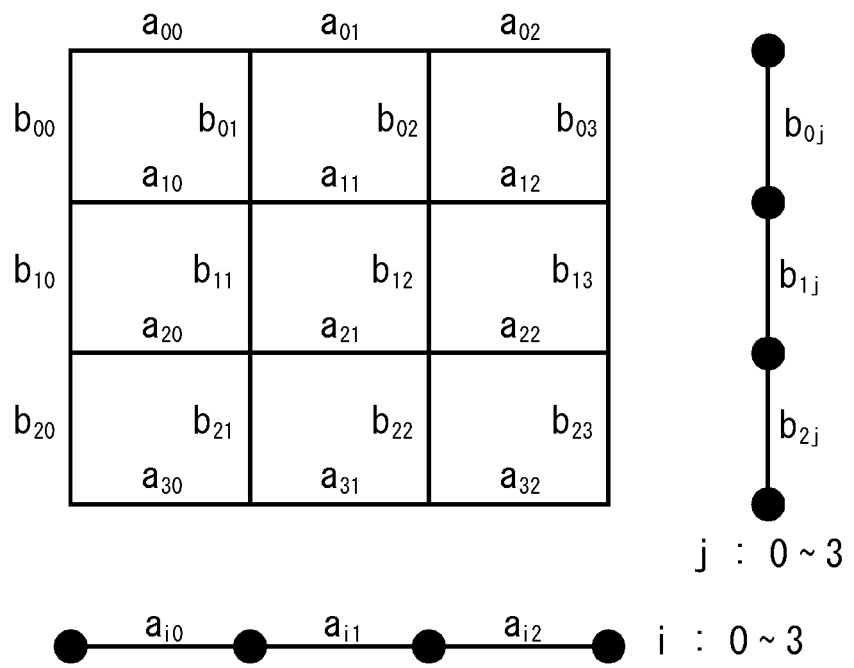

[FIG. 16]
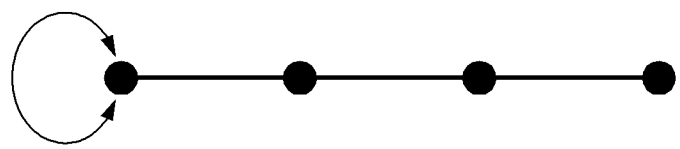
(a)
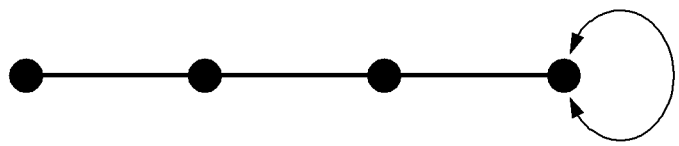
(b)
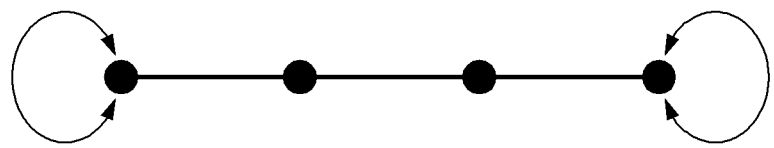
(c)
(d)

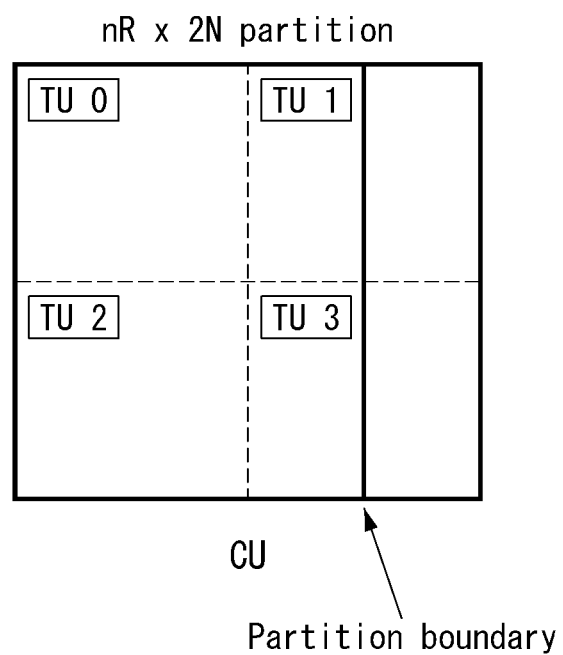
[FIG. 17]

[FIG. 18]
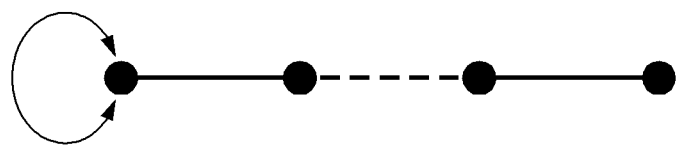
(a)
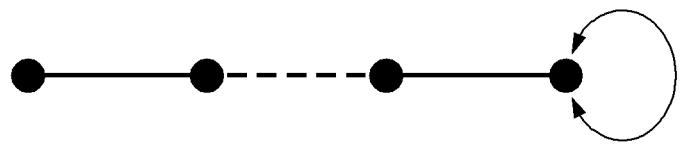
(b)
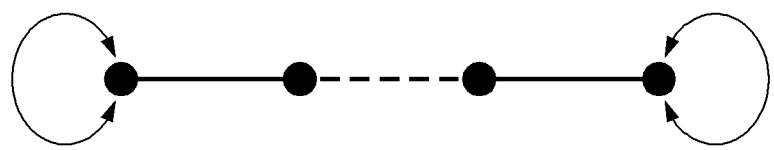
(c)
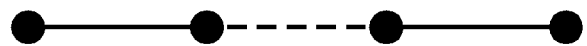
(d)

[FIG. 19]
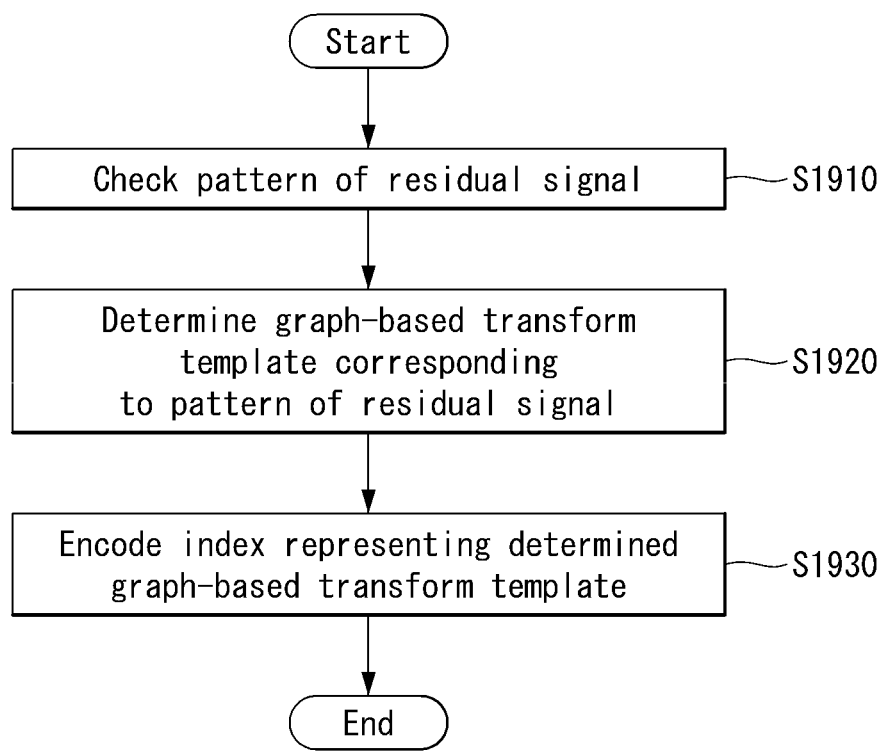

[FIG. 20]
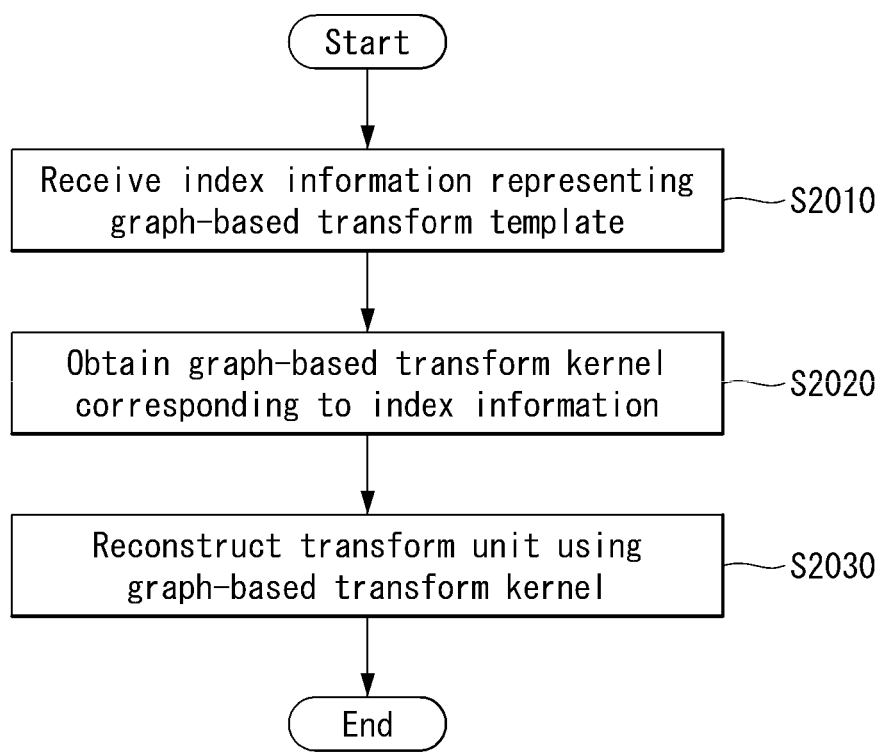

METHOD AND APPARATUS FOR PROCESSING VIDEO SIGNAL USING GRAPH-BASED TRANSFORM

CROSS-REFERENCE TO RELATED APPLICATIONS

This application is a National Stage application under 35 U.S.C. § 371 of International Application No. PCT/KR2016/001252, filed Feb. 4, 2016, which claims the benefit of U.S. Provisional Application No. 62/139,774, filed on Mar. 29, 2015, U.S. Provisional Application No. 62/138,397, filed on Mar. 26, 2015, and U.S. Provisional Application No. 62/115,587, filed Feb. 12, 2015. The disclosures of the prior applications are incorporated by reference in their entirety.

TECHNICAL FIELD

The present invention relates to a method and apparatus for encoding and decoding a video signal using a graph-based transform. More particularly, the present invention relates to a method of adaptively applying a graph-based transform based on heterogeneity between block units and a method of applying separable graph-based transform.

BACKGROUND ART

Compression encoding means a series of signal processing technology for transmitting digitalized information through a communication line or for storing digitalized information in a form appropriate to a storage medium. Media such video, an image, and a voice may be a target of compression encoding, particularly, technology that performs compression encoding using video as a target is referred to as video compression.

Next generation video contents will have a characteristic of a high spatial resolution, a high frame rate, and high dimensionality of scene representation. In order to process such contents, memory storage, memory access rate, and processing power technologies will remarkably increase.

Therefore, it is necessary to design a coding tool for more efficiently processing next generation video contents.

Particularly, a graph is a useful data expression form in describing relation information between pixels, and a graph-based signal processing method of representing and processing such relation information between pixels with a graph is used. In such a graph-based signal processing, each signal sample represents a vertex, and relations of a signal may generalize concepts such as sampling, filtering, and transform using a graph represented with a graph edge having a positive weight. Therefore, a more efficient graph-based signal processing method is required in many application fields as well as a video compression field.

DISCLOSURE

Technical Problem

The present invention provides a method of applying adaptive graph-based transform based on boundary information within a block.

The present invention provides a method of applying adaptively a graph-based transform when a block is complexly split.

The present invention provides a method of reducing an overhead for coding graph information.

The present invention provides a method of defining a template of a graph-based transform and signaling the template.

The present invention provides a method of assigning a code word on a coding mode basis according to an appearance frequency of a graph-based transform template.

The present invention provides a method of applying different separable graph-based transform in a row direction and a column direction of a coding block.

Technical Solution

The present invention provides a method of applying adaptive graph-based transform based on boundary information within a block.

The present invention provides a method of applying a graph-based transform according to prediction unit partition information of a coding unit.

The present invention provides a method of applying different graph-based transform according to a configuration of a coding unit or a transform unit.

The present invention defines flag information representing a graph-based transform to apply in a coding unit or transform unit level.

The present invention provides a method of merging adjacent transform units to apply one transform.

The present invention provides a method of applying transform using partition information about a transform unit.

The present invention provides a method of predicting a graph-based transform of a current block using information about a graph-based transform of a peripheral block.

The present invention provides a method of applying non-square graph-based transform according to prediction unit partition information of a coding unit.

The present invention provides a method of reducing an overhead for coding graph information.

The present invention provides a method of defining a template of a graph-based transform and signaling the template.

The present invention provides a method of assigning a code word on a coding mode basis according to an appearance frequency of a graph-based transform template.

The present invention provides a method of applying different separable graph-based transform in a row direction and a column direction of a coding block.

Advantageous Effects

According to the present invention, by applying adaptive graph-based transform based on boundary information within a block, a video signal can be more efficiently processed, and particularly, when a block is complexly split, a video signal can be more efficiently processed.

Further, according to the present invention, by providing a method of defining a graph-based transform template and signaling the template, an overhead for coding graph information can be remarkably reduced.

Further, by providing a method of assigning a code word on a coding mode basis according to an appearance frequency of a graph-based transform template, a magnitude of transmitting data can be reduced, and by applying different separable graph-based transform in a row direction and a column direction of a coding block, more efficient coding can be performed.

Further, according to the present invention, flexibility that can adaptively apply transform can be secured, and calculation complexity can be reduced.

Further, according to the present invention, faster application to statistical characteristics changing in different video segments can be performed, and when performing transform, changeability can be provided.

Further, according to the present invention, by using separable transform, calculation complexity for coding a video signal can be reduced, and transmission of a transform matrix and an overhead in transform selection can be remarkably reduced.

BRIEF DESCRIPTION OF THE DRAWINGS

FIG. 1 is a block diagram illustrating a configuration of an encoder for encoding a video signal according to an embodiment of the present invention.

FIG. 2 is a block diagram illustrating a configuration of a decoder for decoding a video signal according to an embodiment of the present invention.

FIG. 3 is a diagram illustrating a division structure of a coding unit according to an embodiment of the present invention.

FIG. 4 is a diagram illustrating a process of obtaining a graph-based transform matrix based on a one-dimensional graph and a two-dimensional graph according to an embodiment of the present invention.

FIG. 5 is a block diagram illustrating a configuration of a graph-based transform unit that performs transform based on PU partition information of a coding unit according to an embodiment of the present invention.

FIG. 6 is a diagram illustrating a method of applying transform generated in a one-dimensional graph in a horizontal direction when 2N×2N coding units are split into nL×2N according to an embodiment of the present invention.

FIG. 7 is a flowchart illustrating a process of applying GBT based on PU partition information of a coding unit according to an embodiment of the present invention.

FIG. 8 is a diagram illustrating a method of applying different transform according to boundary information within a block when 2N×2N coding units are split into four N×N transform units according to an embodiment of the present invention.

FIG. 9 is a diagram illustrating a method of applying different transform according to a difference between motion information values of prediction units according to an embodiment of the present invention.

FIG. 10 is a diagram illustrating a method of performing transform by merging a plurality of transform units when a transform unit within a coding unit has a similar property according to an embodiment of the present invention.

FIG. 11 is a diagram illustrating a method of performing transform using partition information of a transform unit according to an embodiment of the present invention.

FIG. 12 is a flowchart illustrating a decoding process of applying GBT based on an edge weight of a graph signal according to an embodiment of the present invention.

FIG. 13 is a diagram illustrating a method of predicting graph-based transform information of a current block using graph-based transform information of a peripheral block according to an embodiment of the present invention.

FIG. 14 is a diagram illustrating a method of applying non-square graph-based transform based on prediction unit partition information of a coding unit according to an embodiment of the present invention.

FIG. 15 is a diagram illustrating a method of applying separable transform to each line of a two-dimensional graph according to an embodiment of the present invention.

FIG. 16 is a diagram illustrating an example of one-dimensional graphs that may become a transform base for applying separable transform according to an embodiment of the present invention.

FIG. 17 is a diagram illustrating a method of signaling a template to which a weight is applied based on boundary information within a block according to an embodiment of the present invention, and FIG. 18 is a diagram illustrating a method of applying one-dimensional separable transform based on boundary information within a block according to an embodiment of the present invention.

FIGS. 19 and 20 are flowcharts illustrating a method of encoding/decoding an index representing a graph-based transform template according to an embodiment of the present invention.

BEST MODE

In accordance with an aspect of the present invention, a method of decoding a video signal using a graph-based transform includes steps of: extracting prediction unit partition information of a current coding unit from the video signal; obtaining a graph-based transform kernel from predetermined table information based on the prediction unit partition information; and performing an inverse-transform of a transform unit using the graph-based transform kernel, wherein the graph-based transform kernel corresponds to at least one of the prediction unit partition information and an edge weight, and the edge weight is a predetermined value representing a correlation between pixels Further, in the present invention, the edge weight has a relatively small value at a division boundary of the prediction unit.

Further, in the present invention, when the coding unit is configured with a plurality of transform units, different transform types are applied to a first transform unit overlapped with the division boundary and a second transform unit not overlapped with the division boundary.

In accordance with another aspect of the present invention, an apparatus for decoding a video signal using a graph-based transform includes: a bitstream extraction unit that extracts prediction unit partition information of a current coding unit from the video signal; and an inverse transform unit that obtains graph-based transform kernel from predetermined table information based on the prediction unit partition information and that performs inverse-transform of a transform unit using the graph-based transform kernel, wherein the graph-based transform kernel corresponds to at least one of the prediction unit partition information and an edge weight, and the edge weight is a predetermined value representing a correlation between pixels.

In accordance with another aspect of the present invention, a method of decoding a video signal using a graph-based transform includes steps of: receiving an edge weight within a graph corresponding to a coding unit, wherein the edge weight is a value representing a correlation between pixels: obtaining a graph-based transform kernel of a transform unit based on the edge weight; and reconstructing the transform unit using the graph-based transform kernel, wherein the edge weight is determined based on coding information of a prediction unit.

In accordance with another aspect of the present invention, a method of encoding a video signal using a graph-based transform includes steps of: calculating an edge weight within a graph corresponding to a coding unit, wherein the edge weight is a value representing a correlation between pixels; generating separately graph-based transform kernels for rows and columns of a transform unit based on coding information of a prediction unit; and performing transform of the transform unit using the graph-based transform kernel, wherein the graph-based transform kernels are generated based on the edge weight, and the edge weight has a relatively small value at a division boundary.

Further, in the present invention, when the coding unit is configured with a plurality of transform units, different transform types are applied to a first transform unit overlapped with the division boundary and a second transform unit not overlapped with the division boundary, and the graph-based transform kernel is applied to the first transform unit, and another transform kernel instead of the graph-based transform kernel is applied to the second transform unit.

Further, in the present invention, coding information of the prediction unit includes at least one of partition information and motion information.

Further, in the present invention, when the coding unit is configured with a plurality of prediction units, if a difference value between motion information of the plurality of prediction units is larger than a predetermined threshold value, the graph-based transform kernel is applied.

In accordance with another aspect of the present invention, an apparatus for decoding a video signal using a graph-based transform includes: an inverse transform unit that receives an edge weight within a graph corresponding to a coding unit, wherein the edge weight is a value representing a correlation between pixels and that obtains graph-based transform kernel of a transform unit based on the edge weight and that reconstructs the transform unit using the graph-based transform kernel, wherein the edge weight is determined based on coding information of a prediction unit.

In accordance with another aspect of the present invention, an apparatus for encoding a video signal using a graph-based transform includes: a graph-based transform unit that calculates an edge weight within a graph corresponding to a coding unit, wherein the edge weight is a value representing a correlation between pixels and that generates separately graph-based transform kernels for rows and columns of a transform unit based on coding information of a prediction unit and that performs transform of the transform unit using the graph-based transform kernel, wherein the graph-based transform kernels are generated based on the edge weight, and the edge weight has a relatively small value at a division boundary.

In accordance with another aspect of the present invention, a method of decoding a video signal using a graph-based transform includes steps of: receiving index information representing a graph-based transform template, wherein the graph-based transform template corresponds to a pattern of residual signals; obtaining a graph-based transform kernel corresponding to the index information; and reconstructing a transform unit using the graph-based transform kernel.

In accordance with another aspect of the present invention, a method of encoding a video signal using a graph-based signal includes steps of: determining a pattern of residual signals; determining a graph-based transform template corresponding to a pattern of the residual signals; and encoding an index representing the determined graph-based transform template.

In accordance with another aspect of the present invention, an apparatus for decoding a video signal using a graph-based transform includes: an inverse transform unit that receives index information representing a graph-based transform template, wherein the graph-based transform template corresponds to a pattern of residual signals and that obtains graph-based transform kernel corresponding to the index information and that reconstructs a transform unit using the graph-based transform kernel.

In accordance with another aspect of the present invention, an apparatus for encoding a video signal using a graph-based signal includes: a graph-based transform unit that determines a pattern of residual signals and that determines a graph-based transform template corresponding to a pattern of the residual signals and that encodes an index representing the determined graph-based transform template.

In accordance with another aspect of the present invention, a method of encoding a video signal using a graph-based transform includes steps of: deriving a one-dimensional edge weight of each row or column within a target unit, wherein the edge weight is a value representing a correlation between pixels; calling one-dimensional graph-based transform kernel corresponding to the one-dimensional edge weight; generating graph-based transform kernel optimized at the target unit by combining the one-dimensional graph-based transform kernel; and performing transform of the target unit using the graph-based transform kernel.

Further, in the present invention, at least one of both end vertexes of a one-dimensional graph corresponding to the one-dimensional graph-based transform kernel includes a self-weight.

MODE FOR INVENTION

Hereinafter, a configuration and operation of an embodiment of the present invention will be described in detail with reference to the accompanying drawings, a configuration and operation of the present invention described with reference to the drawings are described as an embodiment, and the scope, a core configuration, and operation of the present invention are not limited thereto.

Further, terms used in the present invention are selected from currently widely used general terms, but in a specific case, randomly selected terms by an applicant are used. In such a case, in a detailed description of a corresponding portion, because a meaning thereof is clearly described, the terms should not be simply construed with only a name of terms used in a description of the present invention and a meaning of the corresponding term should be comprehended and construed.

Further, when there is a general term selected for describing the invention or another term having a similar meaning, terms used in the present invention may be replaced for more appropriate interpretation. For example, in each coding process, a signal, data, a sample, a picture, a frame, and a block may be appropriately replaced and construed. Further, in each coding process, partitioning, decomposition, splitting, and division may be appropriately replaced and construed.

FIG. 1 shows a schematic block diagram of an encoder for encoding a video signal, in accordance with one embodiment of the present invention.

Referring to FIG. 1, an encoder 100 may include an image segmentation unit 110, a transform unit 120, a quantization unit 130, an inverse quantization unit 140, an inverse transform unit 150, a filtering unit 160, a DPB (Decoded Picture Buffer) 170, an inter-prediction unit 180, an intra-prediction unit 185 and an entropy-encoding unit 190.

The image segmentation unit 110 may divide an input image (or, a picture, a frame) input to the encoder 100 into one or more process units. For example, the process unit may be a coding tree unit (CTU), a coding unit (CU), a prediction unit (PU), or a transform unit (TU).

However, the terms are used only for convenience of illustration of the present disclosure. The present invention is not limited to the definitions of the terms. In this specification, for convenience of illustration, the term "coding unit" is employed as a unit used in a process of encoding or decoding a video signal. However, the present invention is not limited thereto. Another process unit may be appropriately selected based on contents of the present disclosure.

The encoder 100 may generate a residual signal by subtracting a prediction signal output from the inter-prediction unit 180 or intra prediction unit 185 from the input image signal. The generated residual signal may be transmitted to the transform unit 120.

The transform unit 120 may apply a transform technique to the residual signal to produce a transform coefficient. The transform process may be applied to a pixel block having the same size of a square, or to a block of a variable size other than a square.

In an embodiment of the present invention, the transform unit 120 may apply adaptive graph-based transform based on boundary information within a block.

In another embodiment of the present invention, the transform unit 120 may apply a graph-based transform according to prediction unit (PU) partition information of a coding unit.

In another embodiment of the present invention, the transform unit 120 may apply different graph-based transform according to a configuration of a coding unit or a transform unit.

In another embodiment of the present invention, the transform unit 120 may merge adjacent transform units to apply one transform.

In another embodiment of the present invention, the transform unit 120 may apply transform using partition information of a transform unit.

In another embodiment of the present invention, the transform unit 120 may predict a graph-based transform of a current block using information about a graph-based transform of a peripheral block.

In another embodiment of the present invention, the transform unit 120 may apply non-square graph-based transform according to PU partition information of a coding unit.

In another embodiment of the present invention, the transform unit 120 may apply different separate graph-based transform in a row direction and a column direction of a coding unit.

The quantization unit 130 may quantize the transform coefficient and transmits the quantized coefficient to the entropy-encoding unit 190. The entropy-encoding unit 190 may entropy-code the quantized signal and then output the entropy-coded signal as bitstreams.

The quantized signal output from the quantization unit 130 may be used to generate a prediction signal. For example, the quantized signal may be subjected to an inverse quantization and an inverse transform via the inverse quantization unit 140 and the inverse transform unit 150 in the loop respectively to reconstruct a residual signal. The reconstructed residual signal may be added to the prediction signal output from the inter-prediction unit 180 or intra-prediction unit 185 to generate a reconstructed signal.

On the other hand, in the compression process, adjacent blocks may be quantized by different quantization parameters, so that deterioration of the block boundary may occur. This phenomenon is called blocking artifacts. This is one of important factors for evaluating image quality. A filtering process may be performed to reduce such deterioration. Using the filtering process, the blocking deterioration may be eliminated, and, at the same time, an error of a current picture may be reduced, thereby improving the image quality.

The filtering unit 160 may apply filtering to the reconstructed signal and then outputs the filtered reconstructed signal to a reproducing device or the decoded picture buffer 170. The filtered signal transmitted to the decoded picture buffer 170 may be used as a reference picture in the inter-prediction unit 180. In this way, using the filtered picture as the reference picture in the inter-picture prediction mode, not only the picture quality but also the coding efficiency may be improved.

The decoded picture buffer 170 may store the filtered picture for use as the reference picture in the inter-prediction unit 180.

The inter-prediction unit 180 may perform temporal prediction and/or spatial prediction with reference to the reconstructed picture to remove temporal redundancy and/or spatial redundancy. In this case, the reference picture used for the prediction may be a transformed signal obtained via the quantization and inverse quantization on a block basis in the previous encoding/decoding. Thus, this may result in blocking artifacts or ringing artifacts.

Accordingly, in order to solve the performance degradation due to the discontinuity or quantization of the signal, the inter-prediction unit 180 may interpolate signals between pixels on a subpixel basis using a low-pass filter. In this case, the subpixel may mean a virtual pixel generated by applying an interpolation filter. An integer pixel means an actual pixel existing in the reconstructed picture. The interpolation method may include linear interpolation, bi-linear interpolation and Wiener filter, etc.

The interpolation filter may be applied to the reconstructed picture to improve the accuracy of the prediction. For example, the inter-prediction unit 180 may apply the interpolation filter to integer pixels to generate interpolated pixels. The inter-prediction unit 180 may perform prediction using an interpolated block composed of the interpolated pixels as a prediction block.

The intra-prediction unit 185 may predict a current block by referring to samples in the vicinity of a block to be encoded currently. The intra-prediction unit 185 may perform a following procedure to perform intra prediction. First, the intra-prediction unit 185 may prepare reference samples needed to generate a prediction signal. Then, the intra-prediction unit 185 may generate the prediction signal using the prepared reference samples. Thereafter, the intra-prediction unit 185 may encode a prediction mode. At this time, reference samples may be prepared through reference sample padding and/or reference sample filtering. Since the reference samples have undergone the prediction and reconstruction process, a quantization error may exist. Therefore, in order to reduce such errors, a reference sample filtering process may be performed for each prediction mode used for intra-prediction The prediction signal generated via the inter-prediction unit 180 or the intra-prediction unit 185 may be used to generate the reconstructed signal or used to generate the residual signal.

FIG. 2 shows a schematic block diagram of a decoder for decoding a video signal, in accordance with one embodiment of the present invention.

Referring to FIG. 2, a decoder 200 may include an entropy-decoding unit 210, an inverse quantization unit 220, an inverse transform unit 230, a filtering unit 240, a decoded picture buffer (DPB) 250, an inter-prediction unit 260 and an intra-prediction unit 265.

A reconstructed video signal output from the decoder 200 may be reproduced using a reproducing device.

The decoder 200 may receive the signal output from the encoder as shown in FIG. 1. The received signal may be entropy-decoded via the entropy-decoding unit 210.

The inverse quantization unit 220 may obtain a transform coefficient from the entropy-decoded signal using quantization step size information. In this case, the obtained transform coefficient may be associated with the operations of the transform unit 120 as described above with reference to FIG. 1.

The inverse transform unit 230 may inverse-transform the transform coefficient to obtain a residual signal.

A reconstructed signal may be generated by adding the obtained residual signal to the prediction signal output from the inter-prediction unit 260 or the intra-prediction unit 265.

The filtering unit 240 may apply filtering to the reconstructed signal and may output the filtered reconstructed signal to the reproducing device or the decoded picture buffer unit 250. The filtered signal transmitted to the decoded picture buffer unit 250 may be used as a reference picture in the inter-prediction unit 260.

Herein, detailed descriptions for the filtering unit 160, the inter-prediction unit 180 and the intra-prediction unit 185 of the encoder 100 may be equally applied to the filtering unit 240, the inter-prediction unit 260 and the intra-prediction unit 265 of the decoder 200 respectively.

FIG. 3 is a diagram illustrating a division structure of a coding unit according to an embodiment of the present invention.

The encoder may split one video (or picture) in a coding tree unit (CTU) of a quadrangle form. The encoder sequentially encodes by one CTU in raster scan order.

For example, a size of the CTU may be determined to any one of 64×64, 32×32, and 16×16, but the present invention is not limited thereto. The encoder may select and use a size of the CTU according to a resolution of input image or a characteristic of input image. The CTU may include a coding tree block (CTB) of a luma component and a coding tree block (CTB) of two chroma components corresponding thereto.

One CTU may be decomposed in a quadtree (hereinafter, referred to as 'QT') structure. For example, one CTU may be split into four units in which a length of each side reduces in a half while having a square form. Decomposition of such a QT structure may be recursively performed.

Referring to FIG. 3, a root node of the QT may be related to the CTU. The QT may be split until arriving at a leaf node, and in this case, the leaf node may be referred to as a coding unit (CU).

The CU may mean a basic unit of a processing process of input image, for example, coding in which intra/inter prediction is performed. The CU may include a coding block (CB) of a luma component and a CB of two chroma components corresponding thereto. For example, a size of the CU may be determined to any one of 64×64, 32×32, 16×16, and 8×8, but the present invention is not limited thereto, and when video is high resolution video, a size of the CU may further increase or may be various sizes.

Referring to FIG. 3, the CTU corresponds to a root node and has a smallest depth (i.e., level 0) value. The CTU may not be split according to a characteristic of input image, and in this case, the CTU corresponds to a CU.

The CTU may be decomposed in a QT form and thus subordinate nodes having a depth of a level 1 may be generated. In a subordinate node having a depth of a level 1, a node (i.e., a leaf node) that is no longer split corresponds to the CU. For example, as shown in FIG. 3B, CU(a), CU(b), and CU(j) corresponding to nodes a, b, and j are split one time in the CTU and have a depth of a level 1.

At least one of nodes having a depth of a level 1 may be again split in a QT form. In a subordinate node having a depth of a level 2, a node (i.e., a leaf node) that is no longer split corresponds to a CU. For example, as shown in FIG. 3B, CU(c), CU(h), and CU(i) corresponding to nodes c, h, and l are split twice in the CTU and have a depth of a level 2.

Further, at least one of nodes having a depth of a level 2 may be again split in a QT form. In a subordinate node having a depth of a level 3, a node (i.e., a leaf node) that is no longer split corresponds to a CU. For example, as shown in FIG. 3B, CU(d), CU(e), CU(f), and CU(g) corresponding to d, e, f, and g are split three times in the CTU and have a depth of a level 3.

The encoder may determine a maximum size or a minimum size of the CU according to a characteristic (e.g., a resolution) of video or in consideration of encoding efficiency. Information thereof or information that can derive this may be included in bitstream. A CU having a maximum size may be referred to as a largest coding unit (LCU), and a CU having a minimum size may be referred to as a smallest coding unit (SCU).

Further, the CU having a tree structure may be hierarchically split with predetermined maximum depth information (or maximum level information). Each split CU may have depth information. Because depth information represents the split number and/or a level of the CU, the depth information may include information about a size of the CU.

Because the LCU is split in a QT form, when using a size of the LCU and maximum depth information, a size of the SCU may be obtained. Alternatively, in contrast, when using a size of the SCU and maximum depth information of a tree, a size of the LCU may be obtained.

For one CU, information representing whether a corresponding CU is split may be transferred to the decoder. For example, the information may be defined to a split flag and may be represented with "split_cu_flag". The split flag may be included in the entire CU, except for the SCU. For example, when a value of the split flag is '1', a corresponding CU is again split into four CUs, and when a value of the split flag is '0', a corresponding CU is no longer split and a coding process of the corresponding CU may be performed.

In an embodiment of FIG. 3, a split process of the CU is exemplified, but the above-described QT structure may be applied even to a split process of a transform unit (TU), which is a basic unit that performs transform.

The TU may be hierarchically split in a QT structure from a CU to code. For example, the CU may correspond to a root node of a tree of the transform unit (TU).

Because the TU is split in a QT structure, the TU split from the CU may be again split into a smaller subordinate TU. For example, a size of the TU may be determined to any one of 32×32, 16×16, 8×8, and 4×4, but the present invention is not limited thereto, and when the TU is high resolution video, a size of the TU may increase or may be various sizes.

For one TU, information representing whether a corresponding TU is split may be transferred to the decoder. For example, the information may be defined to a split transform flag and may be represented with a "split_transform_flag".

The split transform flag may be included in entire TUs, except for a TU of a minimum size. For example, when a value of the split transform flag is '1', a corresponding TU is again split into four TUs, and a value of the split transform flag is '0', a corresponding TU is no longer split.

As described above, the CU is a basic unit of coding that performs intra prediction or inter prediction. In order to more effectively code input image, the CU may be split into a prediction unit (PU).

A PU is a basic unit that generates a prediction block, and a prediction block may be differently generated in a PU unit even within one CU. The PU may be differently split according to whether an intra prediction mode is used or an inter prediction mode is used as a coding mode of the CU to which the PU belongs.

FIG. 4 is a diagram illustrating a process of obtaining a graph-based transform matrix based on a one-dimensional graph and a two-dimensional graph according to an embodiment of the present invention.

In an embodiment of the present invention, a graph type that may be used for processing a pixel block within an image may be described with reference to FIG. 4. For example, FIG. 4A represents a one-dimensional graph corresponding to each line of a pixel block, and FIG. 4B represents a two-dimensional graph corresponding to a pixel block.

A graph vertex is related to each pixel of a pixel block, and a value of the graph vertex may be represented with a pixel value. A graph edge may mean a line that connects a graph vertex. The graph edge is used for representing statistical dependency of any form within a signal, and a value representing strength thereof may be referred to as an edge weight.

For example, FIG. 4A represents a one-dimensional graph, 0, 1, 2, and 3 represent a position of each vertex, $w_0$, $w_1$, and $w_2$ represent an edge weight between vertexes. FIG. 4B represents a two-dimensional graph, and $a_{ij}$ (i=0, 1, 2, 3, j=0, 1, 2) and $b_{kl}$ (k=0, 1, 2, l=0, 1, 2, 3) represent an edge weight between vertexes.

Each vertex may be connected to entire other vertexes and an edge weight of 0 may be allocated to an edge connecting vertexes that are not related or are weakly related. However, for simplification of expression, an edge having an edge weight of 0 may be completely removed.

In an embodiment of the present invention, transform obtained from a graph signal may be defined to a graph-based transform (hereinafter, referred to as 'GBT'). For example, when relation information between pixels constituting a TU is represented with a graph, transform obtained from the graph may be referred to as GBT.

Relation information between the pixels may be represented with various methods. For example, relation information between the pixels may be represented based on similarity between pixel values, whether the pixels belong to the same PU, and whether the pixels belong to the same object. Relation information between the pixels may be represented with whether an edge exists between the pixels and an edge weight when each pixel corresponds to a vertex of a graph. In this case, the GBT may be obtained through the following process. For example, the encoder or the decoder may obtain graph information from a target block of a video signal. After a Laplacian matrix is obtained from the obtained graph information, by performing eigen decomposition for the Laplacian matrix, as in Equation 1, GBT kernel may be obtained.

$$L = U\Lambda U^T \qquad \text{[Equation 1]}$$

In Equation 1, L is a Laplacian matrix, U is an eigen matrix, and $U^T$ is a transposed matrix of U. Here, U satisfying Equation 1 may mean GBT kernel.

FIG. 5 is a block diagram illustrating a configuration of a graph-based transform unit that performs transform based on PU partition information of a coding unit according to an embodiment of the present invention.

Referring to FIG. 5A, a graph-based transform unit 500 according to an embodiment of the present invention may include a boundary determination unit 510, a transform kernel acquisition unit 520, and a transform performing unit 530. The graph-based transform unit 500 may exist as a separate function unit, as shown in FIG. 5, and in this case, the graph-based transform unit 500 may be positioned in front of the transform unit 120 of the FIG. 1, but the present invention is not limited thereto. Further, the graph-based transform unit 500 may be included within the transform unit 120 of FIG. 1.

When a target unit is split into a plurality of blocks, the boundary determination unit 510 may determine partition information. For example, the target unit may be any one of a CTB, a CU, a PU, a TU, a processing unit, a block, and a frame. In a detailed example, when a current CU is split into a plurality of PUs, the boundary determination unit 510 may detect a boundary from PU partition information.

The transform kernel acquisition unit 520 may obtain transform kernel based on the partition information. Here, the transform kernel may be graph-based transform kernel in consideration of an edge weight, and the graph-based transform kernel may be obtained from a predetermined table stored at the encoder or the decoder. The edge weight is a value representing a correlation between pixels, and it may be determined that the edge weight has a high correlation when the edge weight is adjacent to, for example, 1 and that the edge weight has a low correlation when the edge weight is adjacent to, for example, 0.

Further, the edge weight may be a predetermined fixed value according to partition information. For example, a graph edge overlapped with a partition boundary may have an edge weight smaller than that of a graph edge not overlapped with a partition boundary. This is because a graph edge overlapped with a partition boundary represents a correlation between pixels that belong to another partition.

The transform performing unit 530 may perform transform using the obtained transform kernel.

Referring to FIG. 5B, in another embodiment according to the present invention, the graph-based transform unit 500 may include a graph signal generator 560, a PU division determination unit 570, and an edge weight setting unit 580.

The graph signal generator 560 may generate a graph corresponding to a target unit. For example, the target unit may be any one of a CTB, a CU, a PU, a TU, a processing unit, a block, and a frame. A Laplacian matrix of the graph of Equation 1 may be used for processing a graph-based signal.

When a target unit is split into various shapes of PUs, the PU division determination unit 570 may determine PU partition information.

The edge weight setting unit 580 may adaptively set an edge weight to an edge of the graph signal according to the PU partition information. For example, a graph edge overlapped with a PU partition boundary may have an edge weight smaller than that of a graph edge not overlapped with a PU partition boundary.

The graph-based transform unit 500 may generate corresponding graph-based transform kernel using the edge weight.

In such a case, the encoder may transmit at least one of an edge weight and graph-based transform kernel to the decoder. At least one of the edge weight and the graph-based transform kernel may be transmitted in at least one level of a Sequence Parameter Set (SPS), a Picture Parameter Set (PPS), a slice, a Coding Unit (CU), a Prediction Unit (PU), a block, a polygon, a processing unit, and a specific unit.

In another embodiment according to the present invention, when a combination of available edge weights may be limited, the encoder or the decoder may previously generate transform kernels for an entire combination of the edge weights. In such a case, the encoder may transmit an index of each combination to the decoder to obtain corresponding transform kernels.

FIG. 6 is a diagram illustrating a method of applying transform generated in a one-dimensional graph in a horizontal direction when 2N×2N coding units are split into nL×2N according to an embodiment of the present invention.

Embodiment of Applying GBT Based on PU Partition Information of CU

The present invention provides embodiments that apply GBT based on boundary information between block units. In an embodiment, when the CU is split into various forms of PUs, the GBT may be applied based on boundary information between PUs.

The GBT may be divided and defined to separable GBT and non-separable GBT. Here, the separable GBT may be defined to separately applied one-dimensional transform in a horizontal direction and a vertical direction, and the non-separable GBT may be defined to transform applied one time to an entire N×N image. For example, the non-separable GBT may be $N^2 \times N^2$ transform kernel obtained from an N×N two-dimensional graph. Hereinafter, the separable GBT is referred to as SGBT, and the non-separable GBT is referred to as NSGBT.

Further, in this specification, GBT applied based on PU partition information within the CU is referred to as PGBT, and in the PGBT, separable GBT is referred to as PSGBT, and non-separable GBT is referred to as PNSGBT.

PGBT according to an embodiment of the present invention is as follows. As show in FIG. 6A, when 2N×2N CUs are split into an nL×2N size, if transform is applied in the same size as that of a corresponding CU, transform generated in a 1D graph of FIG. 6A may be applied in a horizontal direction. For example, referring to FIG. 6B, because it is estimated that pixels belonging to different partitions A and B have a small correlation, an edge weight 13 smaller than an edge weight a applied to another graph edge may be given to a graph edge existing at a boundary between a partition A and a partition B. Here, an edge weight is a value representing a correlation level between pixels.

In the 1D graph of FIG. 6B, a Laplacian matrix is generated, and an eigen vector matrix obtained by performing eigen decomposition of Equation 1 in the Laplacian matrix becomes transform kernel generated in a corresponding 1D graph.

FIG. 7 is a flowchart illustrating a process of applying GBT based on PU partition information of a coding unit according to an embodiment of the present invention.

The present invention provides an embodiment of encoding and decoding that apply GBT based on PU partition information of a coding unit. For example, when the CU is split into various forms of PUs, the GBT may be applied based on boundary information between the PUs.

First, when the CU is split into a plurality of PUs, the encoder may determine PU partition information. The encoder may detect a partition boundary from the PU partition information (S710).

The encoder may obtain graph-based transform kernel corresponding to at least one of the PU partition information and a predetermined edge weight from a predetermined table (S720). Here, the edge weight may be a fixed value that is set according to PU partition information. For example, an edge weight of a graph edge overlapped with a PU partition boundary may be set to be smaller than that of a graph edge not overlapped with a PU partition boundary.

The encoder may perform transform of the transform unit using the obtained graph-based transform kernel (S730).

In another embodiment of the present invention, an embodiment of decoding that applies GBT based on PU partition information of the CU is provided. For example, when the CU is split into various forms of PUs, inverse GBT may be applied based on boundary information between PUs. In the decoder, a process similar to that performed in the encoder is performed.

The decoder may extract block split information from a video signal to determine block split information. For example, the block split information may include PU partition information, and the decoder may detect a partition boundary from the PU partition information. Syntax information including the block split information may be extracted by a bitstream extractor (not shown) within the decoder.

The decoder may obtain graph-based transform kernel corresponding to at least one of the PU partition information and a predetermined edge weight from a predetermined table. Here, the edge weight may be a fixed value that is set according to PU partition information. For example, an edge weight of a graph edge overlapped with a PU partition boundary may be set to be smaller than that of a graph edge not overlapped with a PU partition boundary.

The decoder may perform inverse-transform of a transform unit using the obtained graph-based transform kernel.

In another embodiment according to the present invention, the encoder may calculate an edge weight within a graph corresponding to a coding unit. Here, the edge weight may mean a value representing a correlation between pixels.

When the CU is split into various forms of PUs, the encoder may generate separately graph-based transform kernels for rows and columns of the transform unit (TU) based on coding information of the prediction unit (PU). In this case, the graph-based kernels may be generated based on the edge weight, and the edge weight may have a relatively small value at the PU partition boundary.

The encoder may perform transform of the transform unit using the generated graph-based transform kernel.

In another example, when the coding unit is configured with a plurality of transform units, different transform types may be applied to a first transform unit overlapped with the PU partition boundary and a second transform unit not overlapped with the PU partition boundary. For example, the transform type may include at least one of GBT, SGBT, NSGBT, PGBT, PSGBT, PNSGBT, DCT, DST, and KLT.

In a detailed example, the graph-based transform kernel is applied to the first transform unit, and another transform kernel instead of the graph-based transform kernel may be applied to the second transform unit.

FIG. 8 is a diagram illustrating a method of applying different transform according to boundary information within a block when 2N×2N coding units are split into four N×N transform units according to an embodiment of the present invention.

As shown in FIG. 8A, when 2N×2N CUs are split into a size of nL×2N, a left partition is referred to as a partition A, and a right partition is referred to as a partition B. In this case, 2N×2N CUs may be split into four N×N TUs to be transformed, and in this case, different methods of transform may be applied to each TU. For example, PSGBT may be applied to transform blocks TU1 and TU3 including a partition boundary, and DCT may be applied to TU2 and TU4 that do not include a partition boundary. That is, by applying PSGBT to a transform block including a partition boundary, more adaptive transform may be performed.

In this case, each PSGBT may be applied on a row and column basis or PNSGBT obtained from a corresponding 2D graph may be applied at one time. Therefore, even in any partition method or coding structure, GBT may be appropriately applied.

Referring to FIG. 8B, because it is estimated that pixels belonging to other partitions A and B have a small correlation, an edge weight 13 smaller than an edge weight a applied to other graph edges may be given to a graph edge existing at a boundary between the partition A and the partition B.

FIG. 9 is a diagram illustrating a method of applying different transform according to a difference between motion information values of prediction units according to an embodiment of the present invention.

Apply Heterogeneous GBT According to Configuration of CU or TU

Heterogeneous GBT may be applied to one CU based on information such as whether coding has been performed with an intra prediction method or an inter prediction method, a CU size, and heterogeneity of a PU partition.

Heterogeneous GBT may be applied to one TU based on information such as a TU size or whether a PU partition boundary is included. For example, general separable GBT may be applied to a small TU, and PGBT may be applied to a large TU.

In another example, when a motion vector value difference of adjacent PUs is large at one PU boundary, it is determined that two PUs have heterogeneous characteristics, and as shown in FIG. 9A, PGBT may be applied to a PU including a corresponding boundary.

Alternatively, as shown in FIG. 9B, when the motion vector value difference is large, PGBT may not be applied and TUs are split according to a partition boundary and GBT or DCT may be applied to each TU. In this case, a split flag may not be defined.

In another embodiment according to the present invention, in a CU or TU level, GBT to apply may be designated through a flag.

For example, in a CU or TU level, when a transform block meets a PU boundary, by transmitting a flag representing whether to apply PSGBT or DCT (or GBT), a transform kind to apply may be designated.

In another example, when a size of a CU (or TU) is small, specific transform may be applied without a flag, and when a size of a CU (or TU) is large, specific transform may be selectively applied through a flag.

FIG. 10 is a diagram illustrating a method of performing transform by merging a plurality of transform units when a transform unit within a coding unit has a similar property according to an embodiment of the present invention.

Referring to FIG. 10, by merging several adjacent TUs, one transform method may be applied. For example, as shown in FIG. 10, four TUs exist within one CU and when the four TUs (TU1, TU2, TU3, and TU4) have a similar property or coding information, the four TUs are merged into one TU and one transform method may be applied. In this case, as an example of the similar property or coding information, the four TUs may have the same motion information, but the present invention is not limited thereto.

In another embodiment according to the present invention, an embodiment described with reference to FIG. 8 may be applied to the present invention. For example, it may be determined whether to apply PGBT or to apply general GBT using PU boundary information. In a detailed example, when the merged TU block includes a PU boundary, the PGBT may be applied, and when the merged TU block does not include a PU boundary, a general GBT may be applied.

In another embodiment according to the present invention, information about TUs to merge may be separately signaled. For example, by sending bitmap data of a smallest TU unit, TUs having a value of 1 may be merged into one TU. Further, TUs exceeding a CU boundary as well as TUs within the CU may be merged.

In another embodiment according to the present invention, by transmitting flag information (e.g., TU merge flag) about TUs to merge, TUs to merge may be determined. For example, TU merge flag information of 16 TUs may be determined and thus TUs having a TU merge flag of 1 may be selected. It is determined whether TUs having the TU merge flag of 1 are adjacent and for adjacent TUs, merging may be performed. One time of transform may be applied to the merged TUs. For example, when a TU merge flag of TU1, TU2, TU3, and TU4 of FIG. 8 is 1 and when a TU merge flag of the remaining TUs is 0, by merging adjacent TU1, TU2, TU3, and TU4, one transform method may be applied.

FIG. 11 is a diagram illustrating a method of performing transform using partition information of a transform unit according to an embodiment of the present invention.

Apply Transform Using Partition Information of TU

In an embodiment of the present invention, a transform method may be applied in consideration of partition information about a TU separately from a split flag for QT technology of the TU.

For example, as shown in FIG. 11A, it is assumed that the TU is split. TU1 is split in a horizontal direction, and in this case, a transform method of FIG. 11B or 11C may be applied according to partition information of TU1. As shown in FIG. 11B, non-square DCT (NSDCT) may be applied on a partition area basis within TU1. Alternatively, as in a case of FIG. 11C, PGBT may be applied based on partition information.

In another example, in order to reduce an information amount about a TU partition, flag information representing whether TU partition information corresponds with PU partition information or is aligned may be transmitted. For example, when the TU partition corresponds with a PU partition, by transmitting flag information that the TU partition corresponds with the PU partition, TU partition information may be reduced.

In another example, as shown FIG. 10, a shape in which a quadrangle is floated in an intermediate portion may be defined to one form of a TU partition (thick dotted line). Further, an internal partition may be split in a deeper level, as in a TU1, TU2, TU3, and TU4 of FIG. 10.

FIG. 12 is a flowchart illustrating a decoding process of applying GBT based on an edge weight of a graph signal according to an embodiment of the present invention.

In an embodiment of the present invention, a decoding process of applying GBT based on an edge weight of a graph signal is provided.

First, the decoder may receive an edge weight within a graph corresponding to a coding unit (S1210). Here, the edge weight may mean a value representing a correlation between pixels. When the CU is split and coded in various forms of PUs, the edge weight may be determined based on coding information of a prediction unit. In this case, the coding information may include at least one of PU partition information and motion information. The edge weight may have a relatively small value at a division boundary of the prediction unit.

The decoder may obtain graph-based transform kernel of the transform unit based on the edge weight (S1220).

The decoder may reconstruct the transform unit using the graph-based transform kernel (S1230). In this case, when the coding unit is configured with a plurality of transform units, different transform types may be applied to a first transform unit overlapped with the division boundary and a second transform unit not overlapped with the division boundary. For example, the transform type may include at least one of GBT, SGBT, NSGBT, PGBT, PSGBT, PNSGBT, DCT, DST, and KLT.

FIG. 13 is a diagram illustrating a method of predicting graph-based transform information of a current block using graph-based transform information of a peripheral block according to an embodiment of the present invention.

Predict Current GBT Through Peripheral GBT Information

When a kind of GBT to apply to a current TU is similar to that of GBT of a peripheral TU, in order to code GBT to apply to the current TU, GBT information of the peripheral TU may be used. For example, when coding an index representing a GBT kind of the current TU, an index indicating a GBT kind of the peripheral TU may be used as a prediction value. In a detailed example, because vertically adjacent TU 0 and TU 2 of FIG. 13 share the same partition boundary, there is a high possibility that the same GBT may be applied. The same 1D GBT may be applied in a horizontal direction. Therefore, when determining optimal GBT of the current TU, GBT information of the peripheral TU may be used.

In another embodiment according to the present invention, in separable GBT, vertical direction (or horizontal direction) GBT may be used as a predictor from a left TU, and a horizontal direction (or a vertical direction) GBT may be used as a predictor from an upper TU.

In another embodiment, when a peripheral TU belongs to another PU, GBT information may not be referred.

Further, in intra coding, when a PU to which the current TU belongs and a PU to which the peripheral TU belongs are in an angular prediction mode of a similar direction or the same direction, GBT information may be referred.

FIG. 14 is a diagram illustrating a method of applying non-square graph-based transform based on prediction unit partition information of a coding unit according to an embodiment of the present invention.

Apply Non-Square GBT

In an embodiment of the present invention, non-square GBT may be applied based on PU partition information of a CU. For example, as shown in FIG. 14A, when a PU partition exists, N×2N separable GBT (SGBT) or N×2N non-separable GBT (NSGBT) may be applied to each PU partition.

In another embodiment, when a TU is split, two non-square GBT may be applied to a TU including a PU partition boundary and in other case, square GBT or DCT may be applied. For example, as shown in FIG. 14B, a PU partition boundary may exist between PU0 and PU1, and non-square GBT may be applied to a TU, i.e., TU0 and TU2 including a PU partition boundary. In this case, two non-square GBT may be applied to each of TU0 and TU2 based on a PU partition boundary. Square GBT or DCT may be applied to TUs, i.e., TU1 and TU3 that do not include a PU partition boundary.

FIG. 15 is a diagram illustrating a method of applying separable transform to each line of a two-dimensional graph according to an embodiment of the present invention.

FIG. 15 represents a two-dimensional graph corresponding to a pixel block, a graph vertex is related to each pixel of a pixel block, and a value of a graph vertex may be represented with a pixel value. Here, a line connecting graph vertexes means a graph edge. As described above, the graph edge is used for representing statistical dependency of any form within a signal, and a value representing strength thereof may be referred to as an edge weight. For example, FIG. 15 represents a two-dimensional graph, and $a_{ij}$ (i=0, 1, 2, 3, j=0, 1, 2) and $b_{kl}$ (k=0, 1, 2, l=0, 1, 2, 3) represent an edge weight between vertexes.

In an embodiment of the present invention, in a 2D graph that connects a graph edge to only adjacent pixels in a vertical direction (this is referred to as a 4-connected graph), 2D non-separable GBT (NSGBT) may be applied, but 1D separable GBT (SGBT) may be applied to each of a row direction and a column direction.

For example, because each vertex of a 2D graph of FIG. 15 has maximum four adjacent vertexes, it may be referred to as a 4-connected graph, and here, 2D non-separable GBT (NSGBT) kernel may be generated and applied using an edge weight ($a_{ij}$, $b_{kl}$) of each side.

In a detailed example, in a row direction, 1D SGBT of a graph formed with edge weights $a_{i0}$, $a_{i1}$, and $a_{i2}$ of an i-th row may be applied to each row and 1D SGBT of a graph formed with edge weights $b_{0j}$, $b_{1j}$, and $b_{2j}$ of a j-th column may be applied to each column.

In another embodiment, in a random 4-connected graph, different 1D SGBT may be applied to each line (both a horizontal direction and a vertical direction). For example, as shown in FIG. 15, when a combination of an edge weight is different in each row and column, 1D SGBT of each combination may be applied.

When one GBT template set of N×N TUs is configured with the M number of 4-connected graphs, the total M number of $N^2 \times N^2$ transform matrixes should be prepared and thus a memory requiring amount for storing the transform matrixes increases. Therefore, when one 4-connected graph may be configured with a combination of at least one 1D graph element, only transform of at least one 1D graph element is required and thus a memory requiring amount for storing transform matrixes may be reduced.

In an embodiment of the present invention, various 4-connect 2D graphs may be generated with 1D graph elements of the limited number and thus a GBT template set appropriate to each mode combination may be customized. Even if the number of total GBT templates increases, the number of 1D transform forming a base is the same and thus a necessary memory amount may be minimized. For example, as shown in FIG. 15, combinations of ($a_{i0}$, $a_{i1}$, $a_{i2}$) and ($b_{0j}$, $b_{1j}$, $b_{2j}$) of the limited number are prepared and when appropriately connecting the combinations using 1D graphs of each combination in a unit, one 4-connected 2D graph may be generated.

For example, in a current coding block, when graph edge information, partition information, and correlation information between pixels may be received from bitstream or when graph edge information, partition information, and correlation information between pixels may be derived from peripheral information, a combination of 1D transform may be customized using the information.

FIG. 16 is a diagram illustrating an example of one-dimensional graphs that may become a transform base for applying separable transform according to an embodiment of the present invention.

Embodiments of a 1D graph that may be a base of one line may be described as follows.

In a first embodiment, because a correlation is small only in a pixel pair, only a weight of a corresponding edge may be set to be small. For example, because a correlation is relatively small in a pixel pair including a block boundary, a small edge weight may be set to a graph edge including a block boundary.

In a second embodiment, there may be cases in which a self-loop exists or does not exist at both ends and in which a self-loop exists at only one side. For example, FIGS. 16A and 16B represent a case in which a self-loop exists in only one side of both ends of a 1D graph, FIG. 16C represents a case in which a self-loop exists at both ends of a 1D graph, and FIG. 16D represents a case in which a self-loop does not exist at both ends of a 1D graph. Here, a self-loop represents dependency with an adjacent vertex and may mean, for example, a self-weight. That is, a weight may be further given to a portion in which a self-loop exists.

In another embodiment of the present invention, a separate 1D separable transform set may be defined according to a TU size. In non-separable transform, as a TU size increases, transform coefficient data increase to $O(N^4)$, but in separable transform, transform coefficient data increase to $O(N^2)$. Therefore, by combining several 1D separable transform forming a base, the following configuration may be available.

For example, a 1D separable transform template may include a template in which a self-loop exists at the left side, as shown in FIG. 16A, a template in which a self-loop exists at the right side, as shown in FIG. 16B, a template in which self-loops exist at both ends, as shown in FIG. 16C, and a template in which a self-loop does not exist at either one of both ends, as shown in FIG. 16D. When the entire case thereof is available, four cases are available in a row and a column and thus template indexes of total 16 combinations may be defined.

In another embodiment, when a partition boundary or an object boundary exists in an intermediate portion of the TU, a template index is signaled, and a separate template in which a small weight is additionally given may be applied to only an edge corresponding to a boundary.

FIG. 17 is a diagram illustrating a method of signaling a template to which a weight is applied based on boundary information within a block according to an embodiment of the present invention, and FIG. 18 is a diagram illustrating a method of applying one-dimensional separable transform based on boundary information within a block according to an embodiment of the present invention.

In an embodiment of the present invention, information notifying to apply a template in which boundary information is considered may be separately signaled through a flag. For example, as shown in FIG. 17, when one CU is partitioned in an nR×2N form, a PU partition boundary may be formed in a solid line. When the CU is configured with four TUs (TU0, TU1, TU2, and TU3), TU1 and TU3 share a PU partition boundary. Therefore, 1D separable GBT (SGBT) obtained from a 1D graph represented with an edge (indicated by a dotted line) having a small weight in an intermediate portion may be applied to TU1 and TU3, as shown in FIG. 18.

Further, 1D separable GBT (SGBT) appropriate to each direction may be applied and combined to even a TU of a rectangular shape, and different 1D SGBT may be applied in a horizontal/vertical direction.

FIGS. 19 and 20 are flowcharts illustrating a method of encoding/decoding an index representing a graph-based transform template according to an embodiment of the present invention.

In an embodiment of the present invention, GBT of a predetermined pattern may be defined to a GBT template, and a GBT template to apply to every TU may be determined.

When residual data constituting a TU may be represented into several patterns, GBTs of corresponding patterns may be obtained. A pattern of GBT to apply to every TU may be selected.

When the entire information related to a corresponding graph should be coded in every residual data, a considerable overhead will occur. Therefore, as described above, by determining representative patterns and coding an index indicating the pattern, an overhead may be remarkably reduced.

In this specification, the pattern is referred to as a GBT template, and in an embodiment of the present invention, index information that designates a GBT template to apply to every TU may be signaled. In the following embodiment, a method of encoding/decoding the index information is described, a method of reducing using several coding mode information, and a method of adjusting a kind and the number of applied GBT templates on a coding mode basis will be described.

First, the encoder may determine a pattern of residual signals (S1910).

The encoder may determine graph-based transform template (GBT template) corresponding to a pattern of the residual signals (S1920). In this case, the encoder and the decoder may already know information about the GBT template or may determine information about the GBT template upon coding.

The encoder may encode an index representing the determined graph-based transform template (S1930). Encoding may be performed by the transform unit 120 of FIG. 1 or the graph-based transform unit 500 of FIG. 5.

The decoder may receive index information representing a graph-based transform template (S2010). Here, the graph-based transform template may correspond to a pattern of residual signals.

The decoder may obtain graph-based transform kernel corresponding to the index information (S2020).

The decoder may reconstruct a transform unit using the graph-based transform kernel (S2030). This may be performed by an inverse transform unit within the decoder and thus residual signals are reconstructed and added to a predicted signal, thereby reconstructing a video signal.

In another embodiment of the present invention, when allocating a codeword on a GBT template basis and coding side information, different lengths of codewords may be assigned according to an appearance frequency of the GBT template. For example, a short length of codeword may be assigned to a template having a high appearance frequency, and a long length of codeword may be assigned to a template having a low appearance frequency.

In another embodiment, an appearance frequency of GBT templates may be changed according to a coding mode. For example, in intra prediction, an appearance frequency of GBT templates may be changed according to a YUV component, a TU size, and an angular prediction mode. In inter prediction, an appearance frequency of GBT templates may be changed according to a YUV component, a TU size, whether a PU partition boundary exists within a TU, and a value of a fractional portion of a motion vector. Therefore, in the present invention, a method of differently assigning a codeword of GBT templates on a coding mode basis is suggested.

In a first embodiment, a first bit may be assigned as a flag indicating a 0-th GBT template and the remaining GBT templates may be distinguished with the following bits. For example, when the number of entire GBT templates is 9, 0 as a codeword may be assigned to a 0-th GBT template (flag function), and a codeword of 3 bit fixed length is added to the remaining 1-8th GBT templates and 1000-1111 may be assigned to the remaining 1-8th GBT templates.

In another example, as a changed form, a GBT template corresponding to an index 0 (allocate only 1 bit flag) may be differently set according to a coding mode. For example, a 0-th GBT template may be differently set on a combination basis of a YUV component, a TU size, and an intra prediction mode. A GBT template applied with a highest frequency on each mode combination basis may be disposed at a 0-th position.

In a second embodiment, when a plurality of GBT templates representing a similarly large probability exist, the plurality of GBT templates may be split using two or more bits instead of 1 bit flag, and the remaining GBT templates may be classified with the following bits, as in the first embodiment.

In another example, when entire GBT templates are split into groups having a similar probability, different lengths of codewords may be given to each group according to a probability. When probability distributions are different on a mode combination basis, different GBT templates may be matched to every codeword on a mode combination basis. For example, an illustration of codeword allocation in increase order of a GBT template index is represented in Tables 1 and 2.

TABLE 1

| template index | codeword |
|---|---|
| 0 | 0 |
| 1 | 10 |
| 2 | 110 |
| 3 | 1110 |
| 4 | 1111 |

TABLE 2

| template index | codeword |
|---|---|
| 0 | 00 |
| 1 | 01 |
| 2 | 10 |
| 3 | 110 |
| 4 | 1110 |
| 5 | 1111 |

In another embodiment of the present invention, different codeword sets may be assigned to every mode combination. Further, a size of codeword sets may be differently set to every mode combination. This is because a probability distribution of GBT templates is different in every mode combination and an occurrence frequency is very few in specific GBT templates and thus there is no large problem even when codeword sets are excluded from a GBT template list.

In another embodiment of the present invention, different kinds of GBT template sets may be defined according to a mode combination. For example, a mode combination 1 may be selected from GBT templates A, B, C, and D, and a mode combination 2 may be selected from GBT templates B, C, E, F, and G.

In another embodiment of the present invention, in chroma components Cb and Cr, by using the same GBT template for each processing unit (e.g., TU), signaling of a GBT template index of the chroma component may be reduced in a half. Alternatively, by extending a size of a processing unit that signals a GBT template index to a unit (e.g., CU) larger than the TU, a magnitude of side information may be reduced.

In another embodiment of the present invention, separate 1D separable GBT (SGBT) may be applied in a horizontal direction and a vertical direction. In this case, a GBT template index of a horizontal direction and a vertical direction may be separately coded. Because a distribution of GBT templates in a horizontal direction and a distribution of GBT templates in a vertical direction on a mode combination basis are different, different codeword sets may be applied to corresponding GBT templates according to a direction. Further, different GBT template sets may be applied in a horizontal direction and a vertical direction on a mode combination basis, and the number of GBT templates constituting a corresponding GBT template set may be differently configured.

A transform use frequency distribution of a vertical (or horizontal) direction may be changed according to a transform method of a horizontal (or vertical) direction. Therefore, a template set configuration or a codeword allocation method may be separately set to GBT of another direction according to a GBT template of one side direction.

In another embodiment of the present invention, mode encoding may be performed based on similarity between a GBT template index of a peripheral block and a GBT template index of a current block. For example, when a GBT template index of a peripheral block and a GBT template index of a current block are similar, a GBT template index of a peripheral block may be determined to a Most Probable Mode (MPM).

In a detailed example, when a flag of a 0-th GBT template index is 0, 0-th GBT template may be selected, when a flag of a 0-th GBT template index is 1, an mpm_flag may be transmitted. In this case, when the mpm_flag is 1, one of GBT templates of peripheral blocks may be selected, and when the mpm_flag is 0, a GBT template index may be directly transmitted. In this case, the GBT template index may be represented with a fixed length bit row.

As described above, the embodiments explained in the present invention may be implemented and performed on a processor, a micro-processor, a controller or a chip. For example, functional modules explained in FIG. 1 and FIG. 2 may be implemented and performed on a computer, a processor, a microprocessor, a controller or a chip.

As described above, the decoder and the encoder to which the present invention is applied may be included in a multimedia broadcasting transmission/reception apparatus, a mobile communication terminal, a home cinema video apparatus, a digital cinema video apparatus, a surveillance camera, a video chatting apparatus, a real-time communication apparatus, such as video communication, a mobile streaming apparatus, a storage medium, a camcorder, a VoD service providing apparatus, an Internet streaming service providing apparatus, a three-dimensional 3D video apparatus, a teleconference video apparatus, and a medical video apparatus and may be used to code video signals and data signals.

Furthermore, the decoding/encoding method to which the present invention is applied may be produced in the form of a program that is to be executed by a computer and may be stored in a computer-readable recording medium. Multimedia data having a data structure according to the present invention may also be stored in computer-readable recording media. The computer-readable recording media include all types of storage devices in which data readable by a computer system is stored. The computer-readable recording media may include a BD, a USB, ROM, RAM, CD-ROM, a magnetic tape, a floppy disk, and an optical data storage device, for example. Furthermore, the computer-readable recording media includes media implemented in the form of carrier waves, e.g., transmission through the Internet. Furthermore, a bit stream generated by the encoding method may be stored in a computer-readable recording medium or may be transmitted over wired/wireless communication networks.

INDUSTRIAL APPLICABILITY

The exemplary embodiments of the present invention have been disclosed for illustrative purposes, and those skilled in the art may improve, change, replace, or add various other embodiments within the technical spirit and scope of the present invention disclosed in the attached claims.

The invention claimed is:

1. A method of decoding a video signal using graph-based transform, comprising:
   extracting prediction unit partition information of a current coding unit from the video signal;
   obtaining a graph-based transform kernel from predetermined table information based on the prediction unit partition information; and
   performing an inverse-transform of a transform unit using the graph-based transform kernel,
   wherein the graph-based transform kernel corresponds to at least one of the prediction unit partition information and an edge weight, and the edge weight is a predetermined value representing a correlation between pixels,
   wherein the edge weight applied to a graph edge overlapped with a prediction unit partition boundary is smaller than the edge weight applied to the graph edge not overlapped with the prediction unit partition boundary,
   wherein, based on the current coding unit being configured with a plurality of transform units by a quadtree decomposition, different transform types are applied to a first transform unit overlapped with the prediction unit partition boundary and a second transform unit not overlapped with the prediction unit partition boundary,
   wherein the graph-based transform kernel is applied to the first transform unit, and another transform kernel instead of the graph-based transform kernel is applied to the second transform unit, and
   wherein the another transform kernel comprises discrete cosine transform (DCT) or discrete sine transform (DST).

2. A method of encoding a video signal using graph-based transform, the method comprising:
   calculating an edge weight within a graph corresponding to a coding unit, wherein the edge weight is a value representing a correlation between pixels;
   generating separately graph-based transform kernels for rows and columns of a transform unit based on coding information of a prediction unit; and
   performing a transform for the transform unit using the graph-based transform kernel,
   wherein the graph-based transform kernels are generated based on the edge weight,
   wherein the edge weight applied to a graph edge overlapped with a prediction unit partition boundary is smaller than the edge weight applied to the graph edge not overlapped with the prediction unit partition boundary,
   wherein, based on a current coding unit being configured with a plurality of transform units by a quadtree decomposition, different transform types are applied to a first transform unit overlapped with the prediction unit partition boundary and a second transform unit not overlapped with the prediction unit partition boundary,
   wherein the graph-based transform kernel is applied to the first transform unit, and another transform kernel instead of the graph-based transform kernel is applied to the second transform unit, and
   wherein the another transform kernel comprises discrete cosine transform (DCT) or discrete sine transform (DST).

3. The method of claim 2, wherein the coding information of the prediction unit comprises at least one of partition information and motion information.

4. The method of claim 3, wherein the graph-based transform kernel is applied, if a difference value between motion information of a plurality of prediction units is larger than a predetermined threshold value, when the coding unit is configured with a plurality of prediction units.

5. An apparatus for decoding a video signal using graph-based transform, comprising:
   a processor configured to
   extract prediction unit partition information of a current coding unit from the video signal; and
   obtain a graph-based transform kernel from predetermined table information based on the prediction unit partition information and that performs an inverse-transform of a transform unit using the graph-based transform kernel,
   wherein the graph-based transform kernel corresponds to at least one of the prediction unit partition information and an edge weight, and the edge weight is a predetermined value representing a correlation between pixels,
   wherein the edge weight applied to a graph edge overlapped with a prediction unit partition boundary is smaller than the edge weight applied to the graph edge not overlapped with the prediction unit partition boundary,
   wherein, based on the current coding unit being configured with a plurality of transform units by a quadtree decomposition, different transform types are applied to a first transform unit overlapped with the prediction unit partition boundary and a second transform unit not overlapped with the prediction unit partition boundary, wherein the graph-based transform kernel is applied to the first transform unit, and another transform kernel instead of the graph-based transform kernel is applied to the second transform unit, and wherein the another transform kernel comprises discrete cosine transform (DCT) and discrete sine transform (DST).

6. An apparatus for encoding a video signal using graph-based transform, comprising:

a processor configured to calculate an edge weight within a graph corresponding to a coding unit, wherein the edge weight is a value representing a correlation between pixels and that generates separately graph-based transform kernels for rows and columns of a transform unit based on coding information of a prediction unit and that performs transform of the transform unit using the graph-based transform kernel, wherein the graph-based transform kernels are generated based on the edge weight, wherein the edge weight applied to a graph edge overlapped with a prediction unit partition boundary is smaller than the edge weight applied to the graph edge not overlapped with the prediction unit partition boundary, wherein, based on a current coding unit being configured with a plurality of transform units by a quadtree decomposition, different transform types are applied to a first transform unit overlapped with the prediction unit partition boundary and a second transform unit not overlapped with the prediction unit partition boundary, wherein the graph-based transform kernel is applied to the first transform unit, and another transform kernel instead of the graph-based transform kernel is applied to the second transform unit, and wherein the another transform kernel comprises discrete cosine transform (DCT) or discrete sine transform (DST).

7. The apparatus of claim 6, wherein coding information of the prediction unit comprises at least one of partition information and motion information, and the graph-based transform kernel is applied, if a difference value between motion information of a plurality of prediction units is larger than a predetermined threshold value, when the coding unit is configured with a plurality of prediction units.

* * * * *